United States Patent
Ablabutyan et al.

(10) Patent No.: US 10,081,287 B2
(45) Date of Patent: *Sep. 25, 2018

(54) LIFT GATE SYSTEM WITH EXTENSION PLATE AND A LIFT GATE PLATFORM

(71) Applicant: MAXON INDUSTRIES, INC., Santa Fe Springs, CA (US)

(72) Inventors: Karapet Ablabutyan, Glendale, CA (US); Akop Gasparian, Panorama City, CA (US); Aida Sahakyan, Glendale, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,892

(22) Filed: May 10, 2017

(65) Prior Publication Data

US 2017/0240086 A1    Aug. 24, 2017

Related U.S. Application Data

(63) Continuation of application No. 14/684,070, filed on Apr. 10, 2015, now Pat. No. 9,676,316, which is a continuation of application No. PCT/US2013/035862, filed on Apr. 9, 2013, which is a continuation-in-part of application No. 13/878,260, filed as application No. PCT/US2012/059764 on Oct. 11, 2012, now abandoned, said application No. 14/684,070 is a continuation-in-part of application (Continued)

(51) Int. Cl.
*B60P 1/44* (2006.01)

(52) U.S. Cl.
CPC ............. *B60P 1/4414* (2013.01); *B60P 1/445* (2013.01)

(58) Field of Classification Search
CPC ......... B60P 1/445; B60P 1/431; B60P 1/4478; B60P 1/4492; B60P 1/44; B60P 1/4414; B66F 2700/057; B66F 3/32
See application file for complete search history.

(56) References Cited

U.S. PATENT DOCUMENTS

| | | | |
|---|---|---|---|
| 2,654,491 A * | 10/1953 | Duis | B60P 1/4414 414/557 |
| 2,779,488 A | 1/1957 | Trotter et al. | |
| 2,843,277 A | 7/1958 | Brannan | |

(Continued)

OTHER PUBLICATIONS

Final Office action for U.S. Appl. No. 13/878,260, dated Jun. 16, 2015.

(Continued)

*Primary Examiner* — Mark C Hageman
(74) *Attorney, Agent, or Firm* — Brooks Acordia IP Law, PC; Michael Zarrabian

(57) ABSTRACT

The present invention provides a lift gate system. In one embodiment, the lift gate system comprises a lift platform, a lifting mechanism, and at least one stop member. The lifting mechanism moves the lift platform between a raised position and a lowered position. The lift platform is substantially aligned with an extension plate when the lift platform is in the raised position. The stop members are positioned relative to the lift platform to provide a gap between the extension plate and the lift platform when the lift platform is in the raised position.

20 Claims, 33 Drawing Sheets

Related U.S. Application Data

No. 13/878,260, filed as application No. PCT/US2012/059764.

(60) Provisional application No. 61/546,006, filed on Oct. 11, 2012, provisional application No. 61/763,874, filed on Feb. 12, 2013.

(56) References Cited

U.S. PATENT DOCUMENTS

| | | | |
|---|---|---|---|
| 3,251,488 A | | 5/1966 | Brannan et al. |
| 3,269,567 A | | 8/1966 | Lugash |
| 3,534,874 A | * | 10/1970 | Long .................... B60P 1/4414 414/557 |
| 3,700,123 A | * | 10/1972 | Corley, Jr. ............ B60P 1/4414 414/557 |
| 3,830,384 A | | 8/1974 | Barber |
| 3,883,014 A | | 5/1975 | Glomski et al. |
| 4,147,261 A | | 4/1979 | Dautel et al. |
| 4,395,187 A | * | 7/1983 | Corley, Jr. ............. B60P 1/445 187/243 |
| 5,513,943 A | | 5/1996 | Lugash et al. |
| 5,588,793 A | | 12/1996 | Chang |
| 5,941,677 A | | 8/1999 | Boer |
| 7,931,433 B2 | | 4/2011 | Ablabutyan et al. |
| 2002/0182045 A1 | | 12/2002 | Ablabutyan et al. |
| 2007/0258801 A1 | * | 11/2007 | Ablabutyan ............ B60P 1/431 414/540 |

OTHER PUBLICATIONS

International Preliminary Report on Patentability dated Apr. 24, 2014 for International Application No. PCT/US2012/059764.

International Search Report and the Written Opinion dated Jul. 11, 2013 for International Application No. PCT/US2013/035862.

International Search Report and Written opinion dated Jan. 7, 2013 for International Application No. PCT/US2012/059764.

Non-Final Office action for U.S. Appl. No. 14/684,070 dated Jul. 29, 2016.

Notice of Allowance for U.S. Appl. No. 14/684,070 dated Feb. 10, 2017.

* cited by examiner

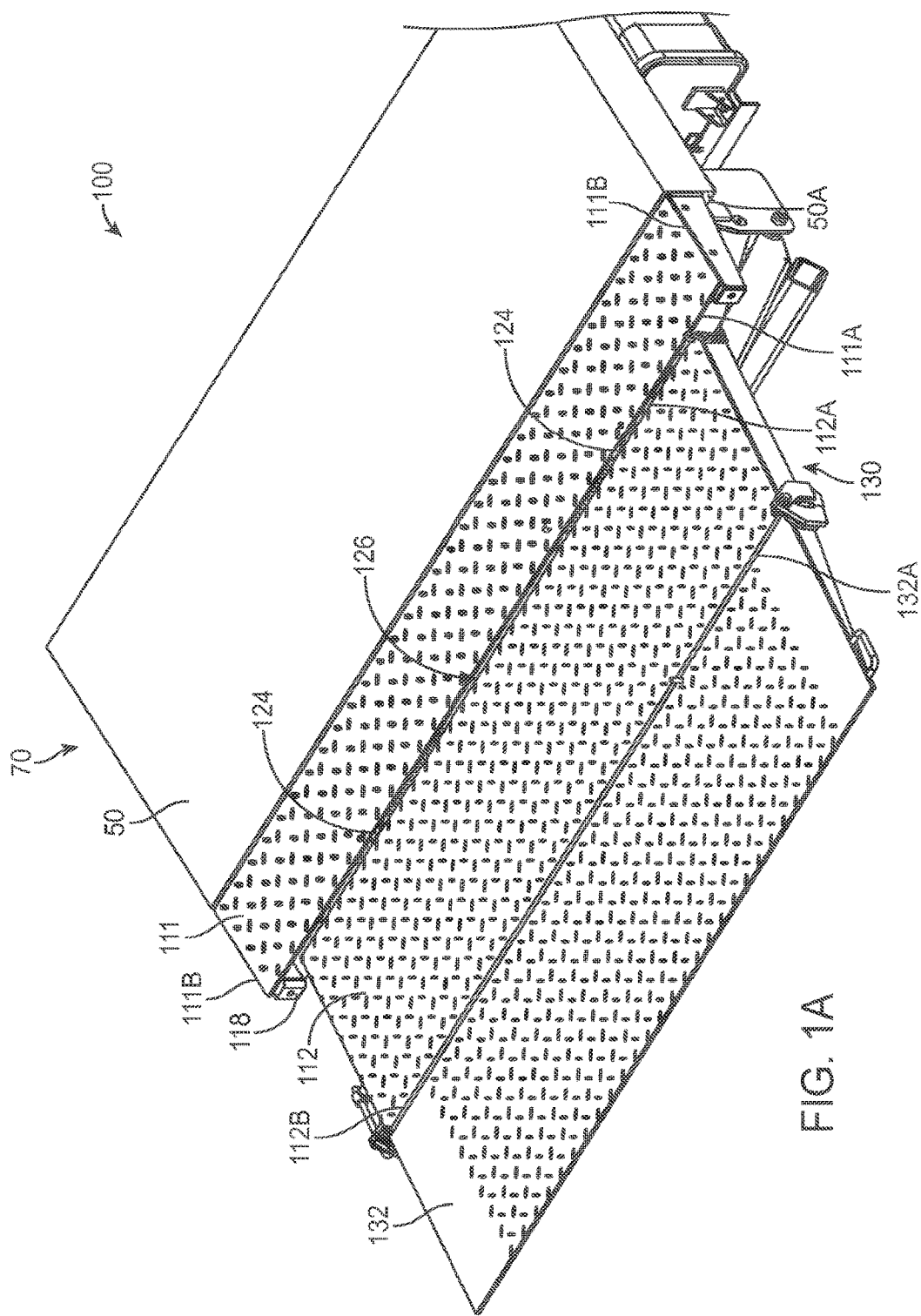

LIFT GATE SYSTEM WITH EXTENSION PLATE AND A LIFT GATE PLATFORM

CROSS REFERENCE TO RELATED APPLICATIONS

This application is a continuation of U.S. application Ser. No. 14/684,070 filed on Apr. 10, 2015, which is a continuation of International Application No. PCT/US2013/035862 filed on Apr. 9, 2013, which is a continuation-in-part of U.S. patent application Ser. No. 13/878,260 filed Apr. 8, 2013, which is a 35 U.S.C. § 371 National Phase Application of International Application No. PCT/US2012/059764 filed Oct. 11, 2012, which claims the benefit of U.S. Provisional Patent Application Ser. No. 61/546,006 filed Oct. 11, 2011. International Application No. PCT/US2013/035862 filed on Apr. 9, 2013 also claims the benefit of U.S. Provisional Patent Application Ser. No. 61/763,874 filed Feb. 12, 2013. U.S. application Ser. No. 14/684,070 filed on Apr. 10, 2015 is also a continuation-in-part of U.S. patent application Ser. No. 13/878,260 filed Apr. 8, 2013, which is a 35 U.S.C. § 371 National Phase Application of International Application No. PCT/US2012/059764 filed Oct. 11, 2012, which claims the benefit of U.S. Provisional Patent Application Ser. No. 61/546,006 filed Oct. 11, 2011. All of which are incorporated herein by reference in their entirety.

BACKGROUND OF THE INVENTION

Field of the Invention

The present invention relates generally to lift gates, and in particular, to a lift gate system with a lift gate platform and an extension plate.

Description of Related Art

Lifts such as lift gates are typically mounted at a structure such as an opening at the rear of a vehicle to lift payloads on a lift platform from one level (e.g., ground level) up to another level (e.g., the bed of the vehicle), and vice versa.

One type of lift gate employs parallelogram linkages to maintain a lift platform in a horizontal plane through the lifting range. The lift platform is attached to the linkages by pivot members, which allow the lift platform to be pivoted. Operation of the lifting mechanism may also rotate the lift platform into an inverted, stowed position beneath the vehicle body. Actuators, such as hydraulic actuators and electric actuators, are used to provide lifting force for moving the lift platform.

BRIEF SUMMARY OF THE INVENTION

The present invention relates to lift gate systems. One embodiment comprises a lift gate system including a lifting mechanism for moving the lift platform between a raised position and a lowered position relative to a mounting structure, wherein the lift platform is substantially aligned with a selected level relative to the mounting structure when the lift platform is in the raised position. The lift gate system further includes at least one stop member that limits movement of the lift platform towards the mounting structure, providing a gap between the mounting structure and the lift platform when the lift platform is in the raised position.

In one embodiment the lift gate system further includes at least one shackle member that interconnects the lift platform with the lifting mechanism. Each shackle member includes a shackle extension corresponding to a stop member. Each shackle extension is configured for making contact with its corresponding stop member when the lift platform is moved to the raised position, to prevent direct impact between the mounting structure and the lift platform when the lift platform is moved to the raised position.

In another embodiment, the mounting structure comprises an extension plate coupled to an opening of a vehicle at said selected level, wherein said at least one stop member is attached proximate to an edge of the extension plate. Each shackle extension is configured for making contact with its corresponding stop member when the lift platform is moved to the raised position, to prevent direct impact between the extension plate and the lift platform when the lift platform is moved to the raised position.

In another embodiment the present invention provides a method comprising positioning at least one stop member relative to a lift gate mounting structure and a lift platform, wherein said at least one stop member provides a gap between the mounting structure and the lift platform when the lift platform is in a raised position, and the lift platform is substantially aligned with a selected level when the lift is in the raised position.

These and other features, aspects and advantages of the present invention will become understood with reference to the following description, appended claims and accompanying figures.

BRIEF DESCRIPTION OF THE DRAWINGS

FIG. 1A illustrates a perspective view of a lift gate, wherein the lift gate platform is in a raised position, in accordance with an embodiment of the invention.

DETAILED DESCRIPTION OF THE INVENTION

Figure 1B:
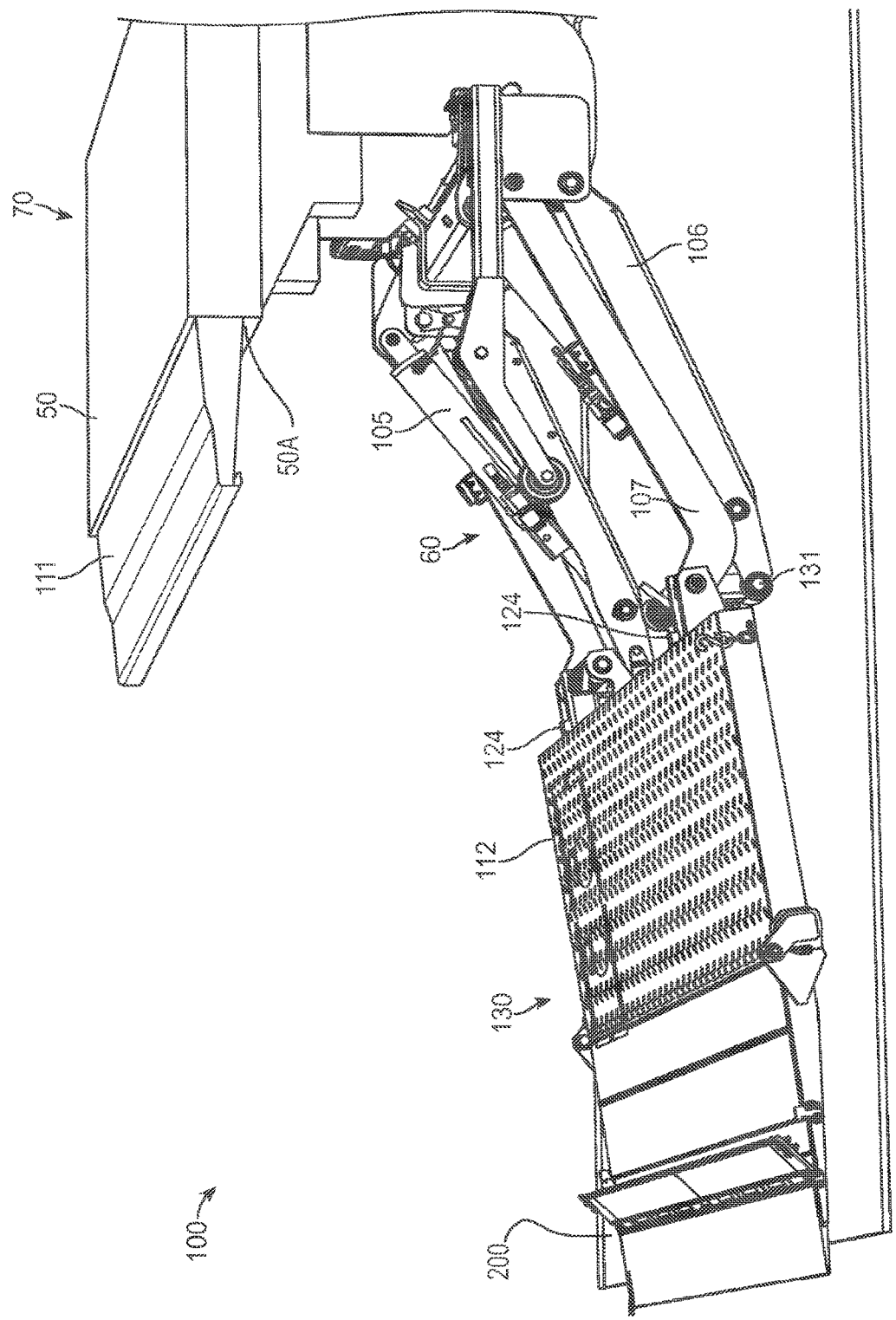
FIG. 1B illustrates a side perspective view of a lift gate, wherein the lift gate platform is in a lowered position, in accordance with an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The present invention provides a lift gate system. In one embodiment, the lift gate system comprises a lift platform, a lifting mechanism, and one or more stop members. The lifting mechanism moves the lift platform between a raised position and a lowered position. The lift platform is substantially aligned with an extension plate of a vehicle (e.g., an extension plate mounted at the bed of a truck opening) when the lift platform is in the raised position. Each stop member is positioned between the extension plate and the lift platform. The stop members provide a gap between an edge of the extension plate and an edge of the lift platform when the lift platform is in the raised position.

In another embodiment, at least one stop member is positioned between an extension plate and a lift platform of a lift gate. The stop members provide a gap between the extension plate and the lift platform when the lift platform is in a raised position. The lift platform is substantially aligned with the extension plate when the lift platform is in the raised position.

The extension plate is coupled to a rear opening of a vehicle. In one embodiment, each stop member is directly adjacent to a proximal edge of the extension plate. In another embodiment, each stop member is directly adjacent to a proximal edge of the lift platform. Each stop member prevents direct impact between the extension plate and the lift platform when the lift platform is raised to the raised position.

Each stop member restricts upward movement of the lift platform when the lift platform is in the raised position, thereby maintaining the lift platform in substantial alignment with the extension plate.

Each opposing end of the extension plate includes a protrusion member. Each protrusion member extends beyond a proximal edge of the extension plate, such that said protrusion member protects the lift gate system against impact.

At least one shackle member interconnects the lift platform with the lifting mechanism. The proximal edge of the extension plate extends beyond each shackle member.

The lifting mechanism comprises at least one hydraulic pump for moving the lift platform, a first pair of parallelogram linkages for supporting the lift platform, a second pair of parallelogram linkages for supporting the lift platform, and at least one pivot point on which a distal end of the lift platform is pivotably mounted for rotation.

In yet another embodiment, a gap is provided between an extension plate and a lift platform of a lift gate when the lift platform is in a raised position. At least one stop member is positioned in the gap. Each stop member is positioned between the lift platform and the extension plate when the lift platform is in the raised position. The lift gate is pushed forward until each one stop member is directly adjacent to both the extension plate and the lift platform. The lift platform is substantially aligned with the extension plate when the lift platform is in the raised position.

Each support bracket has a length. Providing the gap between the extension plate and the lift platform when the lift platform is in the raised position comprises extending the length of each support bracket. Pushing forward the lift gate until each stop member is directly adjacent to both the extension plate and the lift platform comprises pushing forward the lift gate towards the front of the vehicle. The lift gate is stowed further back in relation to the extension plate when the lift gate is pushed forward towards the front of the vehicle.

The drawings in FIG. 1A through FIG. 8 illustrate an embodiment of the invention, wherein FIG. 1A illustrates a top perspective view of a lift gate system 100, in accordance with an embodiment of the invention. The lift gate system includes a lift gate 100, which is shown as mounted on a vehicle opening with an extension plate 111. The lift gate 100 includes a lifting platform 130 which is shown in a raised position in relation to the extension plate 111. The lift gate 100 is configured for mounting at a mounting structure such as a rear frame of a vehicle (e.g., a truck). For example, the lift gate 100 may be attached to a rear opening 50A of a vehicle bed 50 of a vehicle 70, wherein in one example the vehicle includes said extension plate 111. The extension plate 111 may be coupled (e.g., welded, or removably bolted with screws or nuts and bolts) adjacent to the rear opening 50A of the vehicle bed 50 for extending the depth (reach) of the vehicle bed 50 beyond the rear opening 50A.

The load-carrying surfaces of the lift gate 100 comprise said lift platform 130 which in one embodiment includes a platform section 112 and a foldable section ("flipover") 132. The platform section 112 has a first edge 112A and a second edge 112B that is distal to the first edge 112A. A first edge 132A of the flipover 132 is pivotally coupled to the second edge 112B of the platform section 112. The lift platform 130 is used to lift payloads from one level (e.g., ground level 200 in FIG. 1B) up to another level (e.g., the vehicle bed 50 of the vehicle 70), or vice versa.

Embodiments of the invention are useful in different types of lift gate systems. In one embodiment described herein, the lift gate 100 is a stow away lift gate. The lift gate 100 further comprises a lifting mechanism 60 (FIG. 1B) for raising, lowering, and stowing the lift gate 100. The flipover 132 is folded onto the platform section 112 during stowing of the lift gate 100.

In FIG. 1A, the lift platform 130 is shown in the raised position, wherein the platform section 112 is substantially aligned with the extension plate 111. As shown in FIG. 1A, due to the action of one or more stop members 124, the first edge 112A of the platform section 112 is not in direct contact (i.e., not flush) with the first edge 111A of the extension plate 111. As such, there is a gap (i.e., spacing) 126 between the first edge 112A of the platform section 112 and the first edge 111A of the extension plate 111 when the platform section 112 is in the raised position.

In one embodiment, said one or more stop members 124 provide said gap 126 between the first edge 112A of the platform section 112 and the first edge 111A of the extension plate 111 when the platform section 112 is in the raised position. In relation to the stop members 124, the first edge 112A and the second edge 112B of the platform section 112 are the proximal edge 112A and the distal edge 112B of the platform section 112, respectively. In relation to the stop members 124, the first edge 111A of the extension plate 111 is the proximal edge 111A of the extension plate 111. The proximal edge 112A of the platform section 112 and the proximal edge 111A of the extension plate 111 are proximate to the stop members 124.

As described in detail later herein, the stop members 124 act as a buffer between the extension plate 111 and the platform section 112. The stop members 124 prevent direct impact between corresponding edges of the extension plate 111 and the platform section 112 when the platform section 112 is rotated to the raised position to be aligned with the extension plate 111.

FIG. 1B illustrates a side perspective view of the lift gate 100, wherein the lift gate 100 is in a lowered position, in accordance with an embodiment of the invention. As shown in FIG. 1B, the lift platform 130 is in a lowered position. In one embodiment, the lift platform 130 rests against a ground level 200 when the lift platform 130 is in the lowered position.

In one embodiment, the lifting mechanism 60 of the lift gate 100 is a hydraulic system with linkages. For example, the lifting mechanism 60 comprises a pair of hydraulic cylinders 105, a first pair of parallelogram linkage arms 106, and a second pair of parallelogram linkage arms 107. The pair of hydraulic cylinders 105 actuates the raising, lowering, and stowing of the lift gate 100. The linkages 106 and 107 support the lift platform 130 as the lift gate 100 is raised, lowered, or stowed. The linkages 106 and 107 maintain the lift platform 130 in a substantially horizontal plane relative to the ground level 200 as the lift platform 130 is raised/lowered. The platform section 111 follows an arc when travelling between the lowered position (FIG. 1B) and the raised position (FIG. 1A), due to action of the parallelogram lifting mechanism.

The platform section 112 is pivotably mounted for rotation on at least one pivot point 131. During stowing of the lift gate 100, the linkages 106 and 107 and the hydraulic cylinders 105 rotate the lift platform 130 about at least one pivot point 131.

Figure 2:
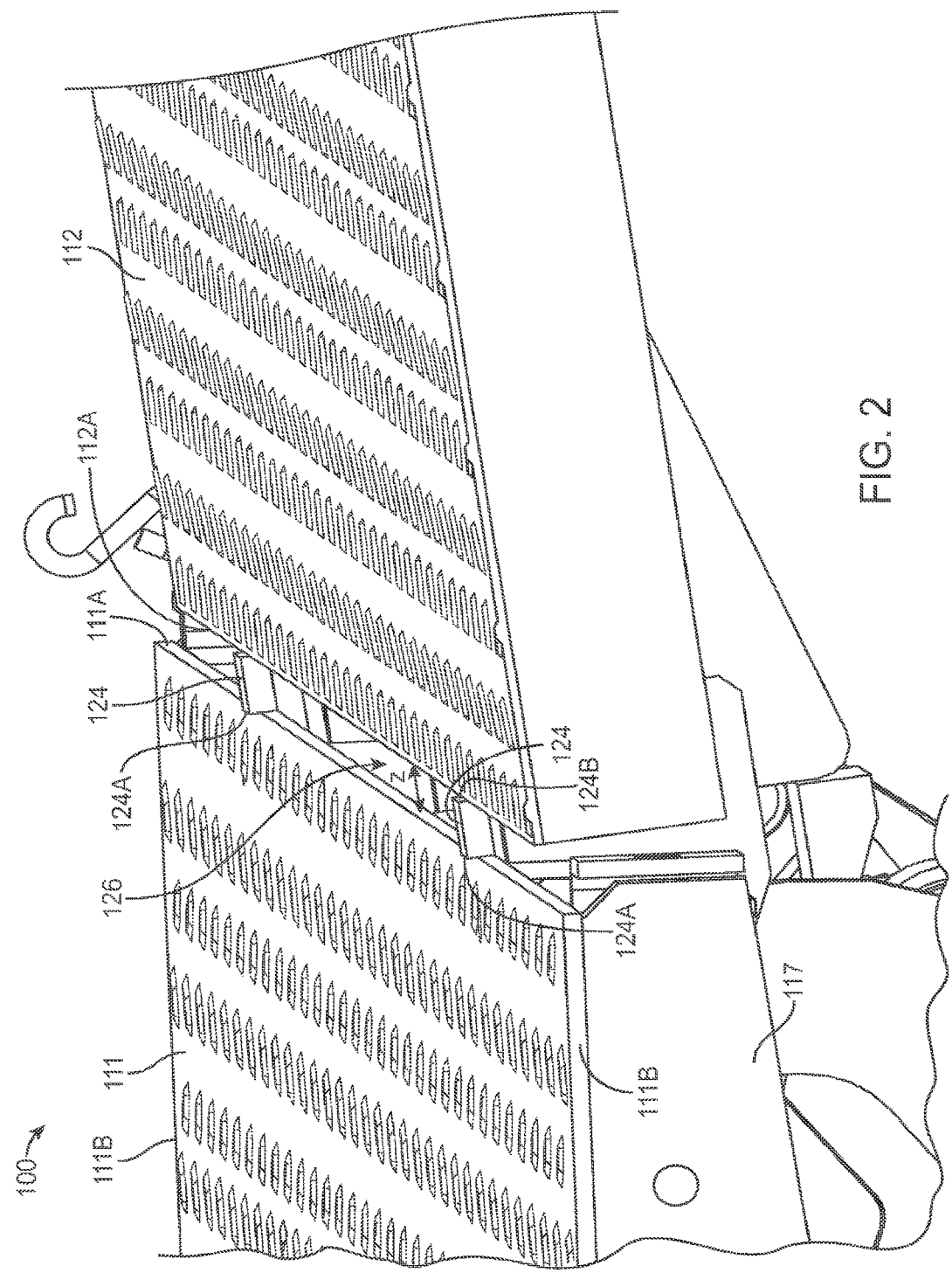
FIG. 2 illustrates a side perspective view of a lift gate, in accordance with an embodiment of the invention.

FIG. 2 illustrates a side perspective view of the lift gate 100, in accordance with an embodiment of the invention. The shape of the stop members 124 may vary. In one embodiment, the stop members 124 are substantially block shaped. For example, each stop member 124 has a width that is approximately 0.63 inches (about 1.60 centimeters), a height that is approximately 0.375 inches (about 0.95 centimeters), and a length that is approximately 1.5 inches (about 3.81 centimeters). The present invention is not limited to a stop member 124 with the example width, height, and length provided.

Each stop member 124 has a first side 124A and a second side 124B that is opposite of the first side 124A. The stop members 124 are positioned directly between the platform section 112 and the extension plate 111. Specifically, the proximal edge 111A of the extension plate 111 is in direct contact with the first side 124A of each stop member 124. As shown in FIG. 2, there is no gap (i.e., no spacing) between the first side 124A of each stop member 124 and the proximal edge 111A of the extension plate 111.

Each stop member 124 is essentially sandwiched between edges 111A and 112A when the platform section 112 is in the fully raised position, as shown in FIG. 2. The stop members 124 prevent direct impact between corresponding edges of the extension plate 111 and the platform section 112 when the platform section 112 is rotated to the raised position to be aligned with the extension plate 111. In the raised position of the platform section 112, one or more edges 111A and 112A may exert a force on the stop members 124 due to the action of the lifting mechanism 60.

Also shown in FIG. 2, the proximal edge 112A of the platform section 112 is in direct contact with the second side 124B of each stop member 124. There is no gap between the second side 124B of each stop member 124 and the proximal edge 112A of the platform section 112.

In one embodiment, the stop members 124 are integral with the platform section 112. For example, the stop members 124 may be welded directly adjacent to the proximal edge 112A of the platform section 112. In another embodiment, the stop members 124 are integral with the extension plate 111. For example, the stop members 124 may be attached directly adjacent to the proximal edge 111A of the extension plate 111.

The stop members 124 provide the gap 126 between the proximal edge 112A of the platform section 112 and the proximal edge 111A of the extension plate 111 when the platform section 112 is in the raised position. In one embodiment, the gap 126 has a width z between 0.50 inches (about 1.27 centimeters) and 0.63 inches (about 1.60 centimeters). The example numerical range provided for the width z of the gap 126 is an approximate numerical range only, and the present invention is not limited to gaps with a width within this numerical range.

Without the stop members 124, the entire proximal edge 112A of the platform section 112 impacts against the proximal edge 111A of the extension plate 111 when the platform section 112 is raised from the lowered position to the raised position. The direct impact between the extension plate 111 and the platform section 112 may cause the extension plate 111 and/or the platform section 112 to buckle and be damaged.

Therefore, the stop members 124 act as a buffer between the extension plate 111 and the platform section 112. The stop members 124 prevent direct impact between the extension plate 111 and the platform section 112. For example, the stop members 124 prevent the entire proximal edge 112A of the platform section 112 from hitting against the proximal edge 111A of the extension plate 111 as the platform section 112 is raised from the lowered position to the raised position.

The stop members 124 may be replaced after wear and tear. For example, the stop members 124 may be replaced with new stop members 124 when the width z of the gap 126 becomes smaller than 0.50 inches (about 1.27 centimeters) because of wear and tear. The width z of the gap 126 should be approximately 0.63 inches (about 1.60 centimeters) when new stop members 124 are positioned between the platform section 112 and the extension plate 111.

The stop members 124 also limit upward movement of the lift platform 130 when the platform section 112 is in the raised position. As noted, the proximal edge 111A of the extension plate 111 is in direct contact with the first side 124A of each stop member 124 when the platform section 112 is in the raised position. The direct contact between the extension plate 111 and each stop member 124 restricts the platform section 112 from further upward movement, thereby maintaining the platform section 112 in substantial alignment with the extension plate 111. Therefore, when the platform section 112 is in the raised position, the stop members 124 prevent actuating components of the lift gate 100 (e.g., the lifting mechanism 60) from moving the platform section 112 above, and out of substantial alignment with, the extension plate 111.

Figure 3:
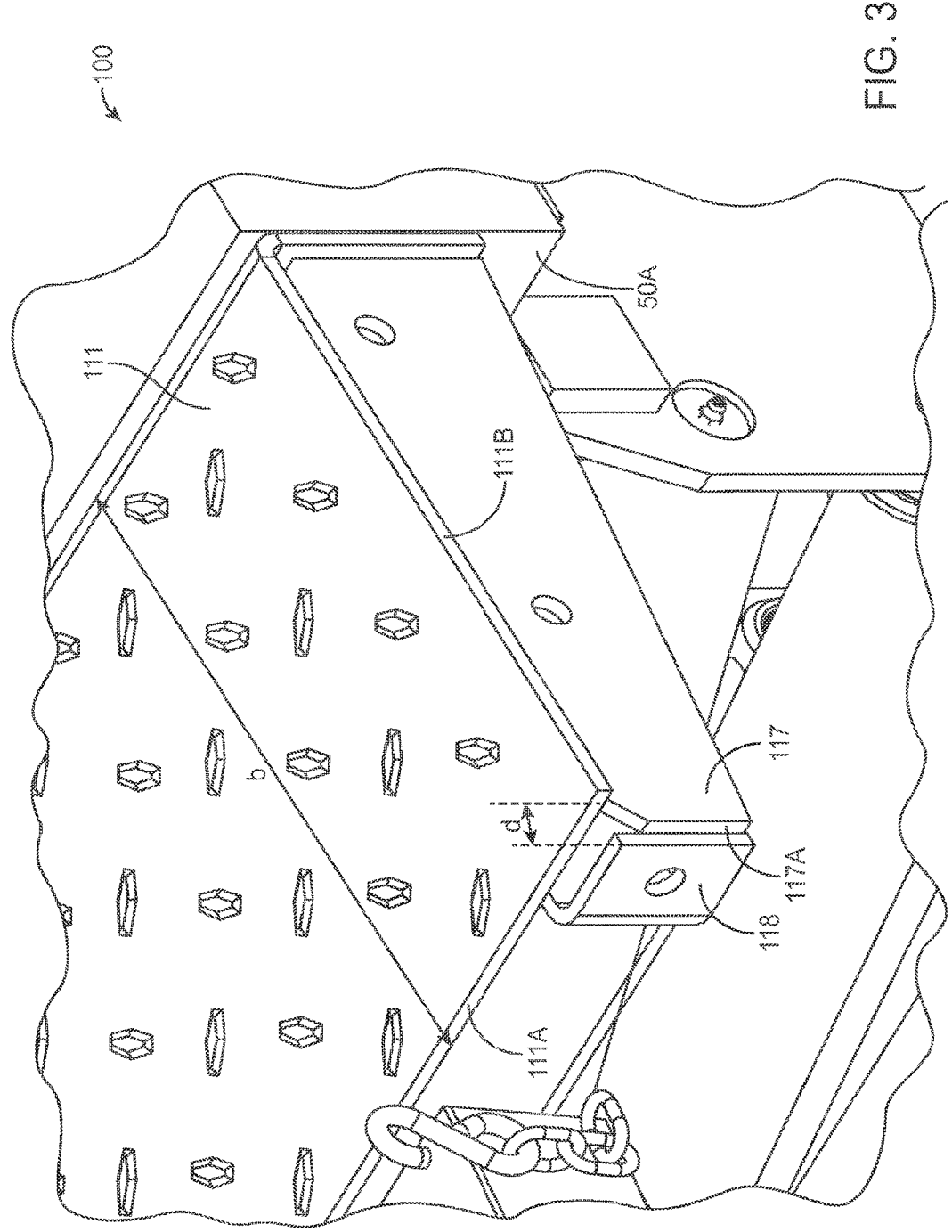
FIG. 3 illustrates a side perspective view of an extension plate, in accordance with an embodiment of the invention.

FIG. 3 illustrates a side perspective view of the extension plate 111, in accordance with an embodiment of the invention. In one example, a width of the extension plate 111, denoted as b, is between 12 inches (about 30.48 centimeters) and 12.75 inches (about 32.385 centimeters). The example numerical range provided for the width b of the extension plate 111 is an approximate numerical range only, and the present invention is not limited to an extension plate 111 with a width within this numerical range.

In one embodiment, the extension plate 111 has a pair of opposing ends 111B. Each opposing end 111B of the extension plate 111 includes a bracket 117 that extends along the underside of said opposing end 111B. Each bracket 117 has a first edge 117A that is proximate to the proximal edge 111A of the extension plate 111.

In one embodiment, each opposing end 111B of the extension plate 111 optionally further includes a protrusion member (i.e., a cap member) 118 that is disposed directly adjacent, and substantially transverse, to the first edge 117A of the bracket 117 of said opposing end 111B. Each protrusion member 118 extends (i.e., protrudes) beyond the proximal edge 111A of the extension plate 111. In the drawings, d denotes the distance by which each protrusion member 118 extends beyond the proximal edge 111A of the extension plate 111. For example, the distance d may be approximately 0.75 inches (about 1.905 centimeters). The present invention is not limited to a protrusion member 118 that extends beyond the proximal edge 111A of the extension plate 111 by the example distance provided.

Without the protrusion members 118, one or more components of the lift gate 100, such as the lift platform 130 or the extension plate 111, may hit against a dock of a docking area when the lift gate 100 is stowed (FIG. 6) and the vehicle 70 (FIG. 1A) backs into the docking area for loading/unloading.

Therefore, the protrusion members 118 buffer the lift gate 100 against impact on a dock when the lift gate 100 is stowed underneath the vehicle 70. For example, the protrusion members 118 are the first to hit against the dock of the docking area when the vehicle 70 backs into the docking area for loading/unloading. Therefore, the protrusion members 118 protect the lift platform 130 and other components of the lift gate 100 from hitting against the dock of the docking area when the lift gate 100 is in the stowed position.

Figure 4:
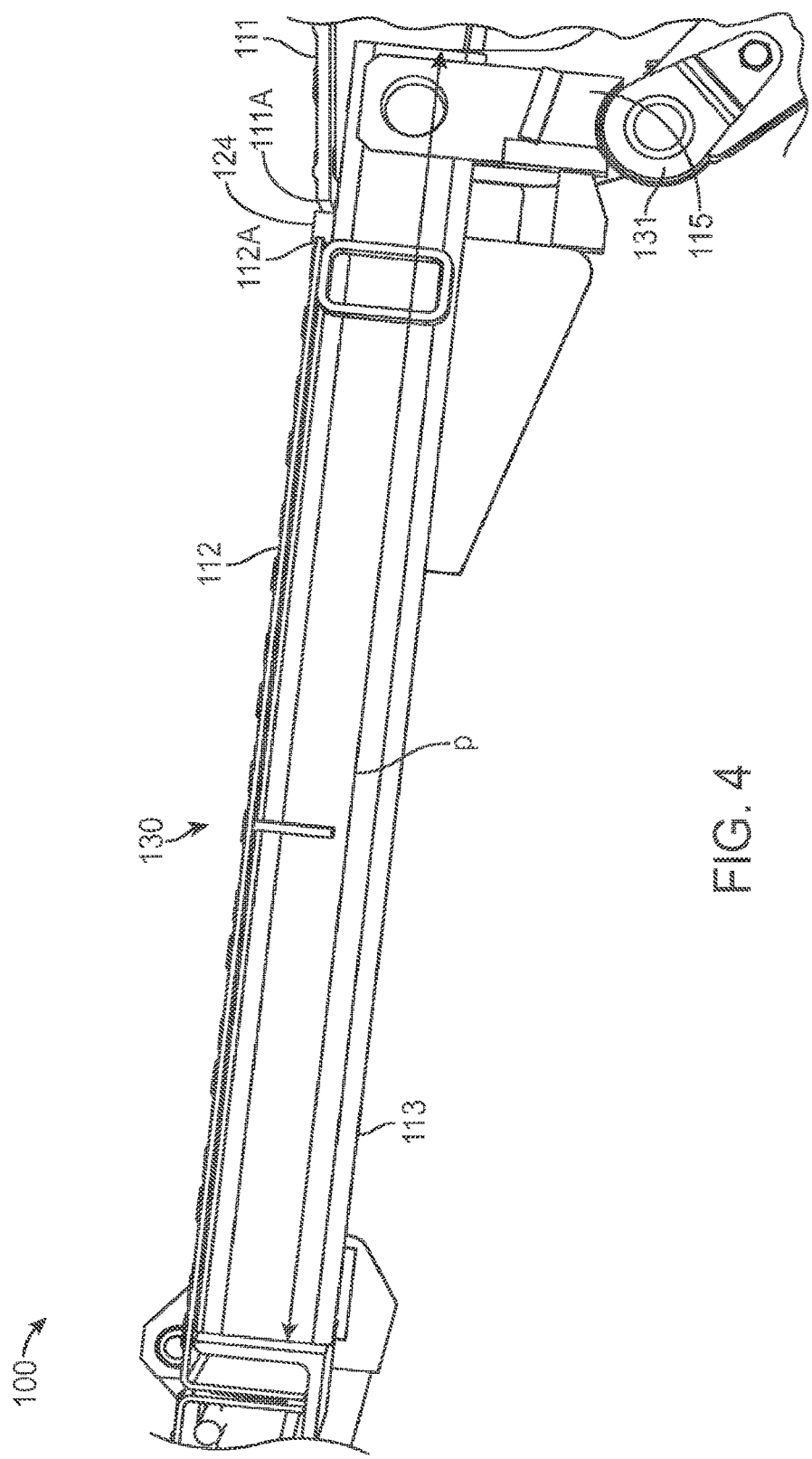
FIG. 4 illustrates a cross-sectional view of a lift gate, in accordance with an embodiment of the invention.
Figure 5:
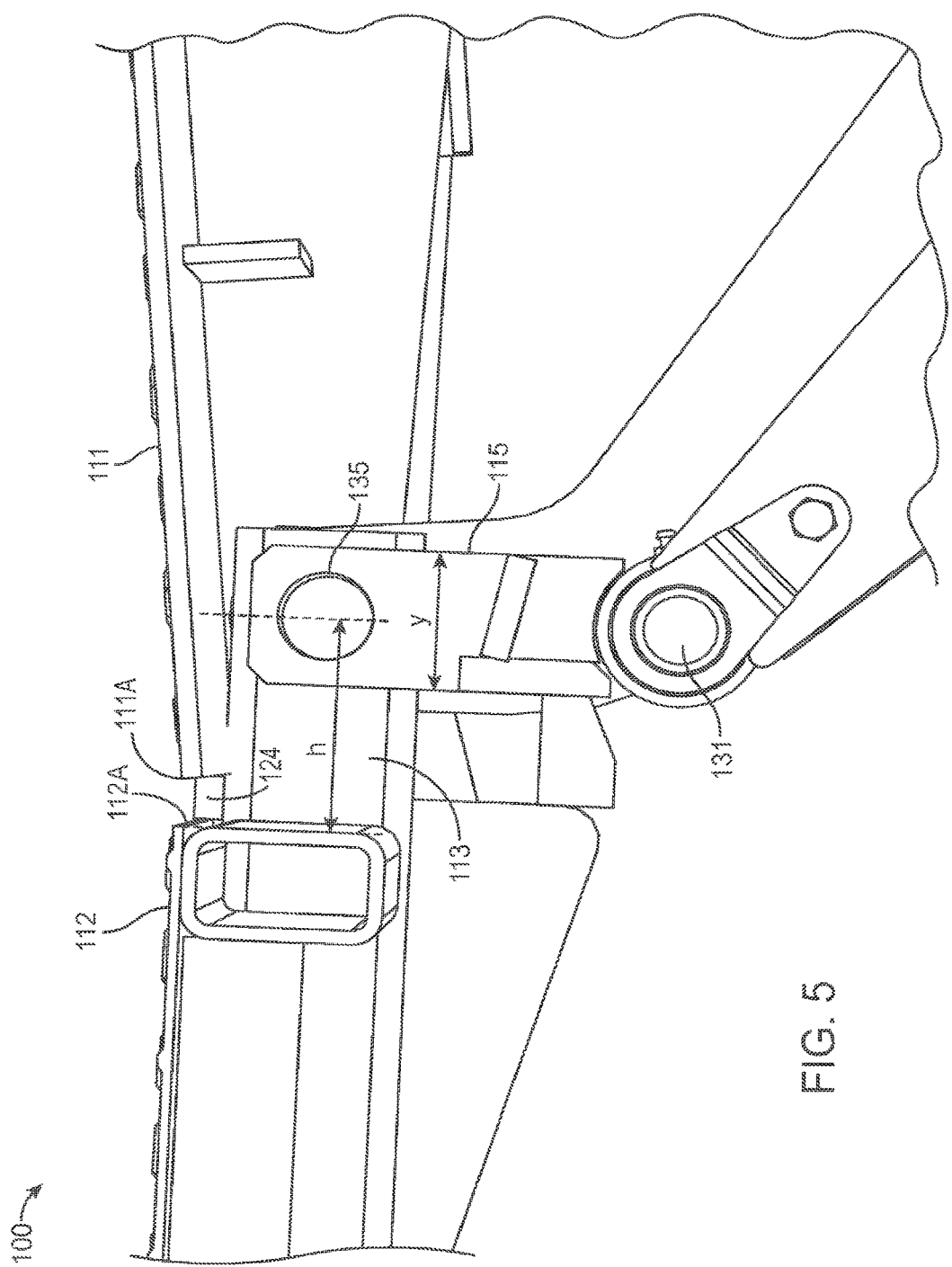
FIG. 5 illustrates an example shackle member of a lift gate, in accordance with an embodiment of the invention.

FIG. 4 illustrates a cross-sectional view of the lift gate 100, in accordance with an embodiment of the invention. The lift gate 100 further comprises shackle members 115. The shackle members 115 are connecting links that interconnect the platform section 112 with the lifting mechanism 60 (FIG. 1B). FIG. 5 illustrates an example shackle member 115, in accordance with an embodiment of the invention. The lift gate 100 further comprises support brackets 113 extending longitudinally along the underside of the platform section 112, to support the platform section 112. The support brackets 113 support the platform section 112 when the lifting mechanism 60 (FIG. 1B) raises or lowers the lift platform 130. The support brackets 113 further connect the platform section 112 to connecting links of the lift gate 100, such as shackle members 115. As shown in FIG. 4, each support bracket 113 has a length p.

In one embodiment, the distance (i.e., overhang) between the proximal edge 112A of the platform section 112 and the centre of a pivot point 135 of each shackle member 115 is denoted as h. For example, the distance h is approximately 3 inches (about 7.62 centimeters). The present invention is not limited to the example distance provided.

As shown in FIG. 5, each shackle member 115 further has a width y. For example, the width y of each shackle member 115 is approximately 2 inches (about 5.08 centimeters). In another example, the width of a wider shackle member 115 is approximately 2.5 inches (about 6.35 centimeters).

The stop members 124 may be spaced apart by positioning each stop member 124 on top of a corresponding support bracket 113.

Figure 6:
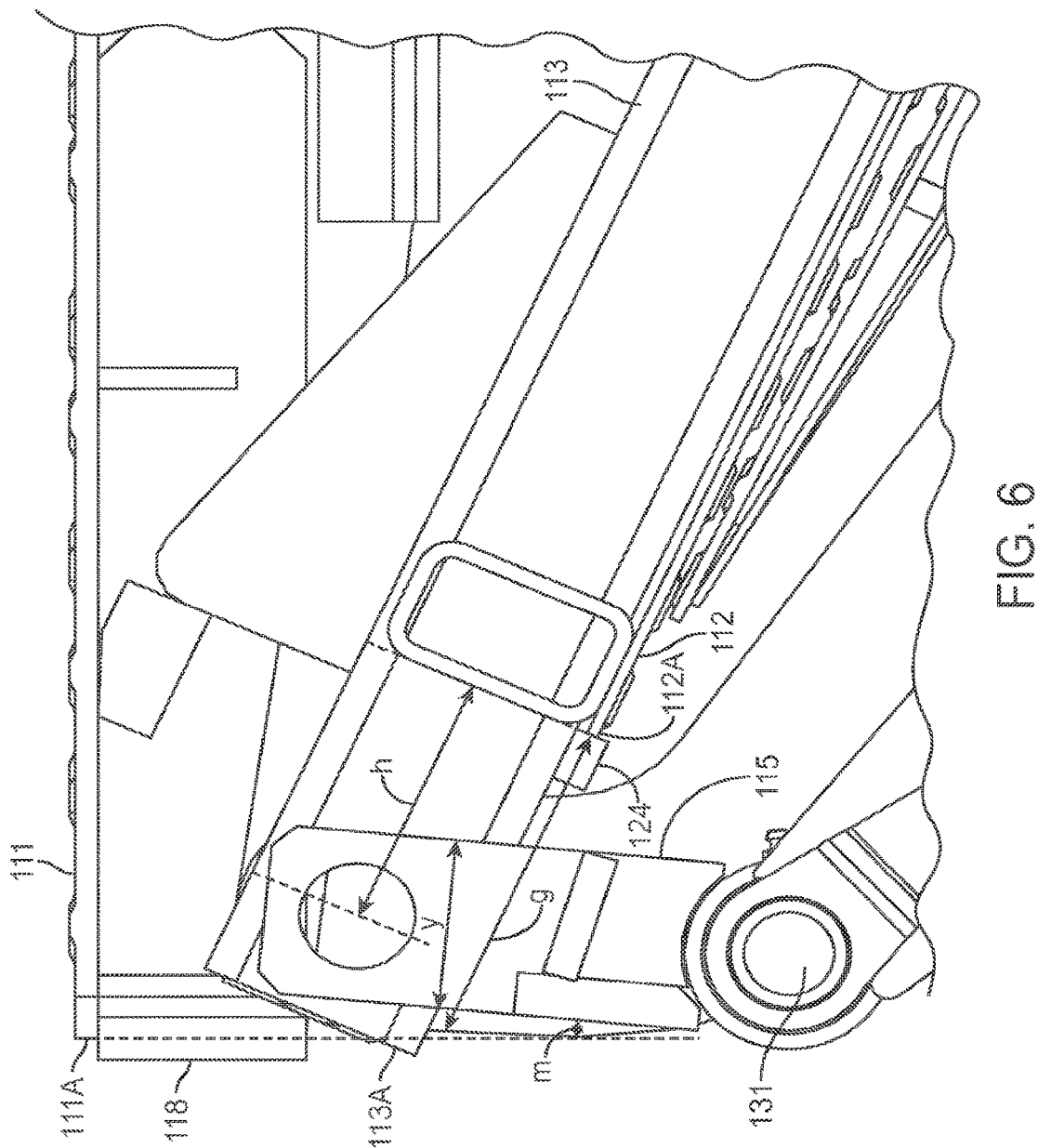
FIG. 6 illustrates a lift gate in the stowed position, in accordance with an embodiment of the invention.

FIG. 6 illustrates the lift gate 100 in the stowed position, in accordance with an embodiment of the invention. In case the shackle member 115 protrudes beyond the proximal edge 111A of the extension plate 111 when the lift gate 100 is stowed underneath the vehicle 70 (potentially impacting against a dock of a docking area when the vehicle 70 backs into the docking area for loading/unloading), narrowing the width of the shackle member 115 may prevent the shackle member 115 from extending beyond the proximal edge 111A of the extension plate 111 when the lift gate 100 is in the stowed position. The smaller width y provides a clearance m that prevents the shackle member 115 from hitting against the dock of the docking area when the lift gate 100 is stowed and the vehicle 70 backs into the docking area for loading/unloading.

Figure 7:
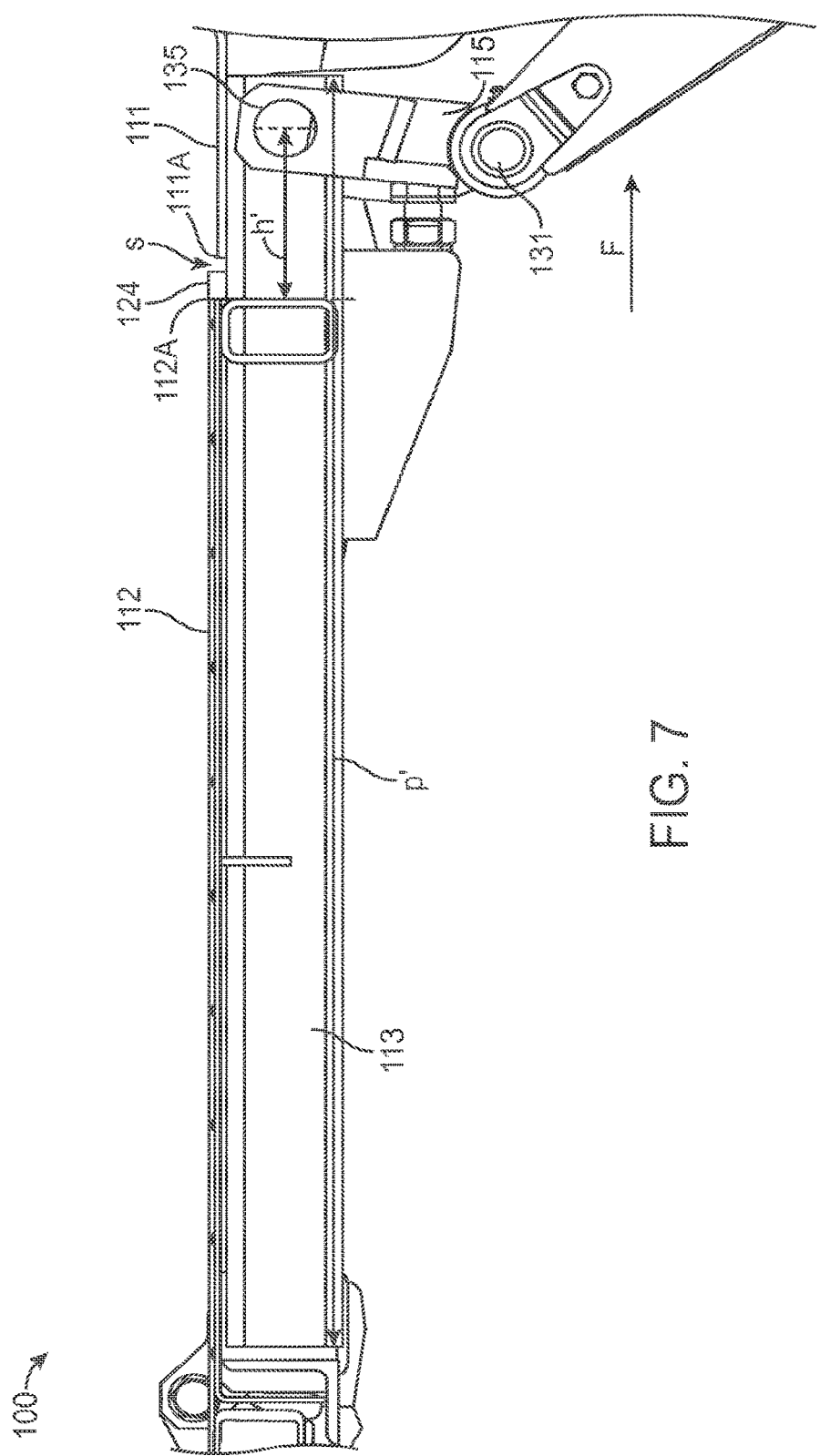
FIG. 7 illustrates a cross-sectional view of a lift gate, wherein lift platform support brackets of the lift gate are extended, in accordance with an embodiment of the invention.

FIG. 7 illustrates a cross-sectional view of the lift gate 100, wherein the support brackets 113 of the lift gate 100 are extended, in accordance with an embodiment of the invention. In this embodiment, each support bracket 113 has a length p' that is longer than the length p in FIG. 4. For example, the length p' may be longer than the length p by approximately 1 inch (about 2.54 centimeters).

In another embodiment, increasing the length of each support bracket 113 to length p' may provide the gap 126 (FIG. 2) between the extension plate 111 and the platform section 112 when the lift platform 130 is in the raised position. The gap 126 allows for stop members 124 to be positioned between the extension plate 111 and the platform section 112.

Increasing the length of each support bracket 113 to length p' increases the distance h (FIG. 4) between the edge 112A of the platform section 112 and the centre of the pivot point 135 of each shackle member 115 to h' (FIG. 7). The amount by which the distance between the platform section 112 and each shackle member 115 increases is relative to the amount by which the length of each support bracket 113 is increased by. For example, if the length of each support bracket 113 is increased by approximately 1 inch (about 2.54 centimeters), the distance between the platform section 112 and each shackle member 115 increases by approximately 1 inch (about 2.54 centimeters).

As such, h' denotes the distance between the edge 112A of the platform section 112 and the centre of the pivot point 135 of each shackle member 115 when the length of each support bracket 113 is increased to p'. For example, the distance h' is approximately 4 inches (about 10.16 centimeters). The present invention is not limited to the example distance provided.

Increasing the length of each support bracket 113 to length p' may provide a spacing s between the stop members 124 and the proximal edge 111A of the extension plate 111. In a lift gate installation method according to an embodiment of the invention, to minimize/reduce the spacing s during the lift gate installation/adjustment, the lift gate 100 is moved/shifted in a direction F towards the rear opening 50A of the vehicle 70 as shown in FIG. 7. The lift gate 100 is moved/shifted until the stop members 124 come in direct contact with the proximal edge 111A of the extension plate 111 when the platform section 112 is in the raised position as shown in FIG. 7.

Figure 8:
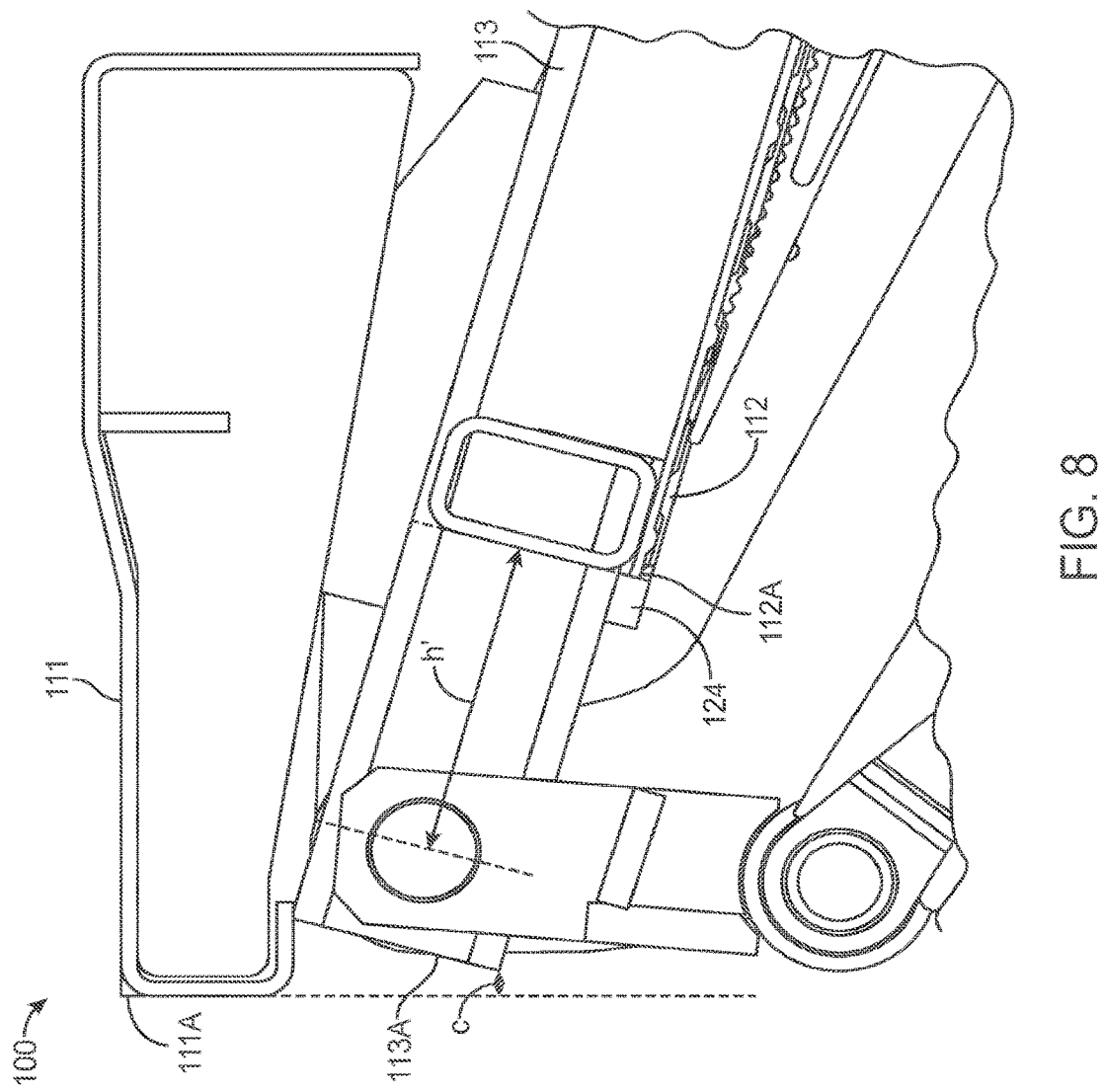
FIG. 8 illustrates a lift gate in the stowed position, wherein the lift gate is stowed further back from a proximal edge of an extension plate under the vehicle bed than the lift gate in FIG. 6, in accordance with an embodiment of the invention.

Also shown in FIG. 6, if an edge 113A of each support bracket 113 extends beyond the proximal edge 111A of the extension plate 111 when the lift gate 100 is in the stowed position, shifting the lift gate 100 towards the rear opening 50A during installation shifts each support bracket 113 under extension plate 111, such that the brackets 113 do not extend beyond the proximal edge 111A of the extension plate 111 when the lift gate 100 is in the stowed position, as shown in FIG. 8.

FIG. 8 illustrates the lift gate 100 in the stowed position, wherein the lift gate 100 is stowed further back towards the vehicle from the proximal edge 111A of the extension plate 111 than the lift gate 100 in FIG. 6, in accordance with an embodiment of the invention.

Also shown in FIG. 8, the edge 113A of each support bracket 113 does not extend (i.e., does not protrude) beyond the proximal edge 111A of the extension plate 111 when the lift gate 100 is in the stowed position. This is because moving/shifting the lift gate 100 in the direction F (FIG. 7) towards the vehicle 70 (FIG. 1A) provides a clearance c when the lift gate 100 is in the stowed position. The clearance c protects each support bracket 113 from hitting against a dock of a docking area when the vehicle 70 backs into the docking area for loading/unloading, because the extension plate 111 is the first to contact the dock (indicated by the vertical dashed line in FIG. 8).

Further, increasing the length of each support bracket 113 to p' increases the distance between the proximal edge 112A of the platform section 112 and the centre of the pivot point 135 (FIG. 7) of each shackle member 115 to distance h'. With the increased distance h', the proximal edge 112A of the platform section 112 is further away from the proximal edge 111A of the extension plate 111 when the lift gate 100 is in the stowed position.

Figure 9:
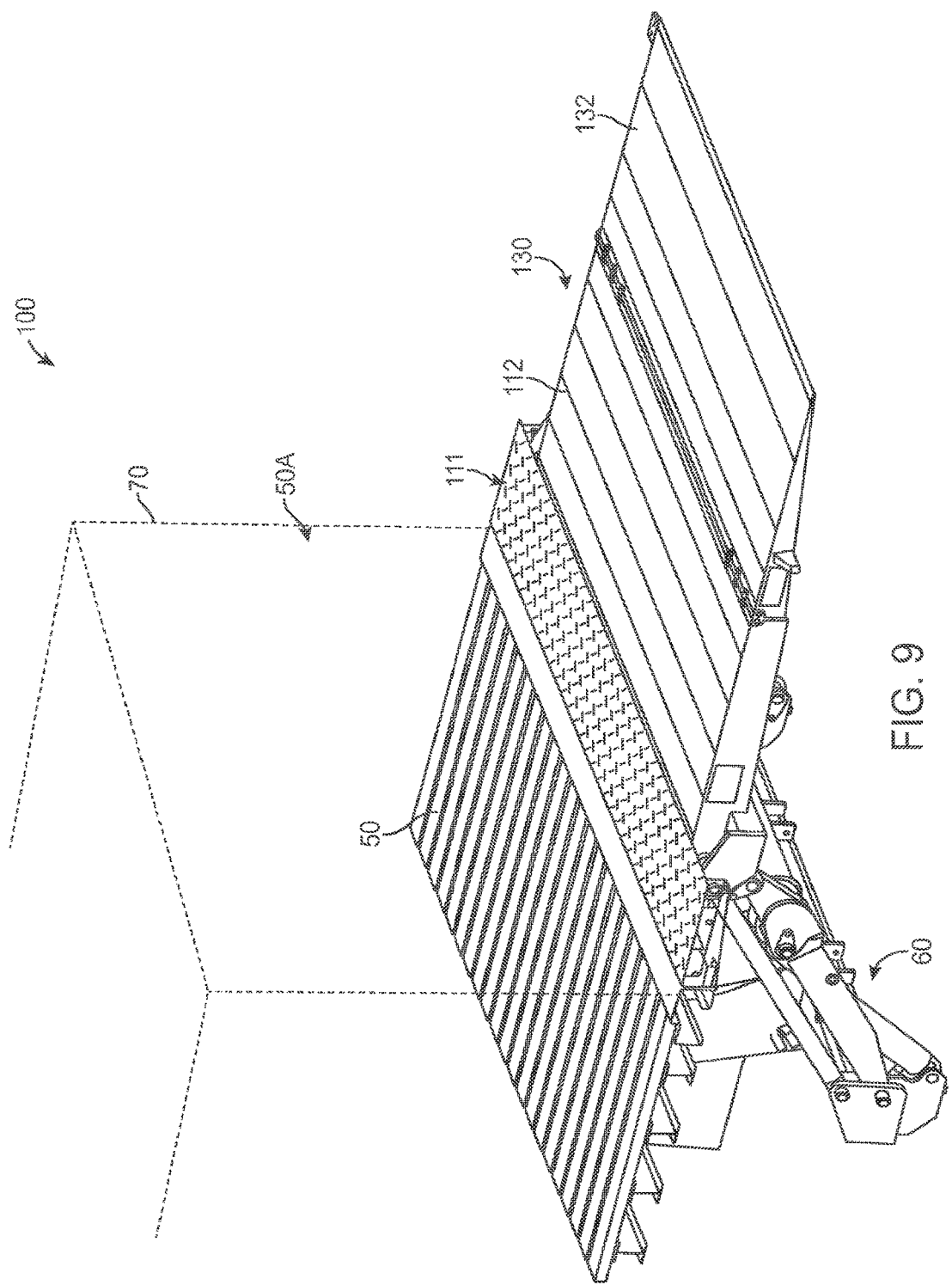
FIG. 9 illustrates a perspective view of a lift gate, wherein the lift gate platform is in a raised position, in accordance with an embodiment of the invention.

The drawings in FIG. 9 through FIG. 32 illustrate other embodiments of the invention. FIG. 9 illustrates a perspective view of a lift gate system including a lift gate 100, in accordance with another embodiment of the invention. FIG. 11 shows a partial bottom left side perspective view of the lift gate 100. The lift gate 100 comprises a lift platform 130, a lifting mechanism 60, and one or more stop members 125.

The lifting mechanism moves the lift platform 130 between a raised position (shown in FIG. 9) and a fully lowered position (i.e., lift platform 130 is lowered to the ground level 200). When the lift platform 130 is in the raised position, the lift platform 130 is substantially aligned with an extension plate 111 mounted at the bed 50 of a truck opening.

The lift gate 100 is configured for mounting at a structure such as a rear frame of a vehicle (e.g., a truck) 70. For example, the lift gate 100 may be attached to the rear opening 50A of a vehicle bed 50 of a truck, having said extension plate 111. The extension plate 111 may be coupled (e.g., welded, or removably bolted with screws or nuts and bolts) adjacent to a rear face 50B (FIG. 11) of the vehicle bed 50 for extending the depth (reach) of the vehicle bed 50 beyond the rear opening 50A.

Figure 10:
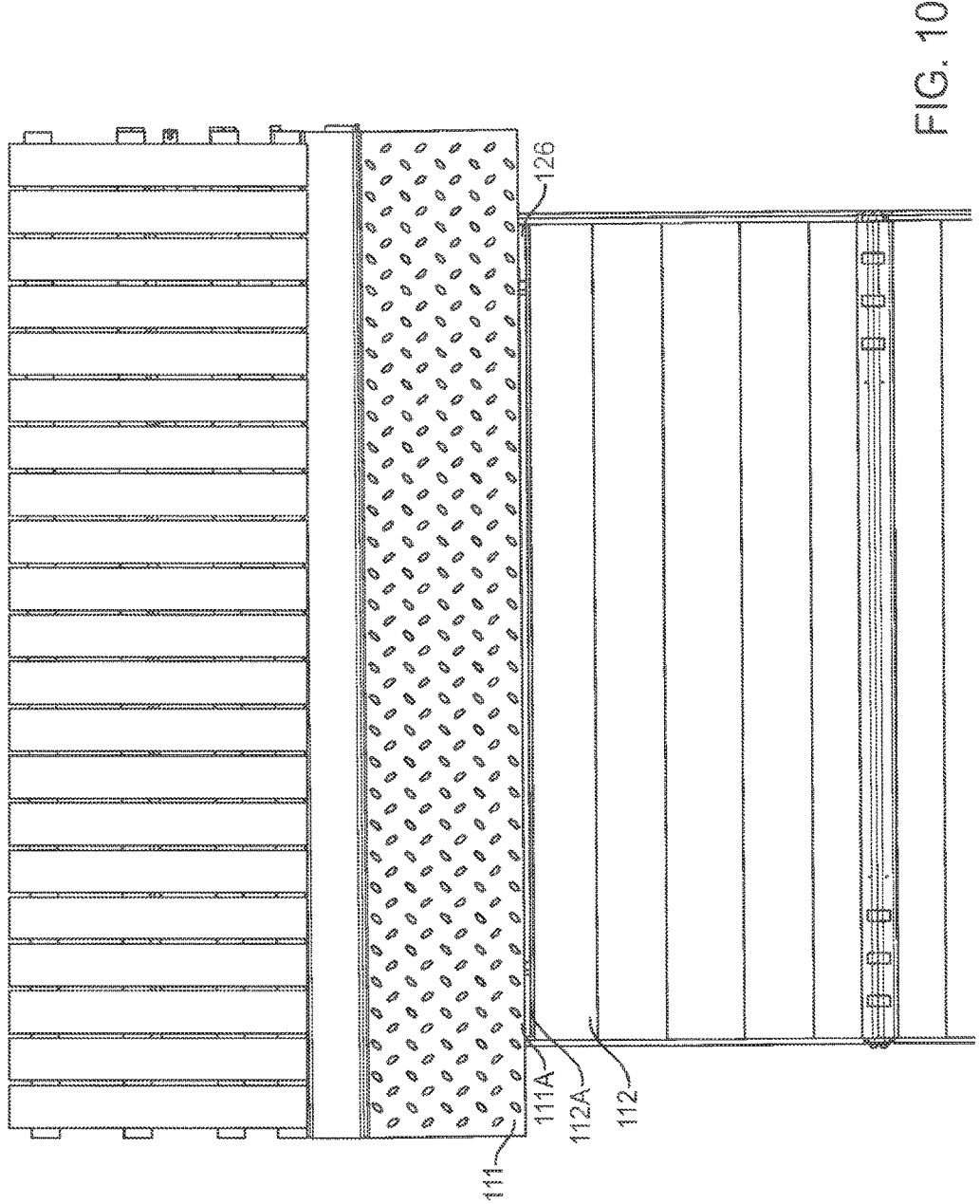
FIG. 10 shows a top view of the lift gate shown in FIG. 9, with the lift platform in fully raised position, in accordance with an embodiment of the invention.
Figure 11:
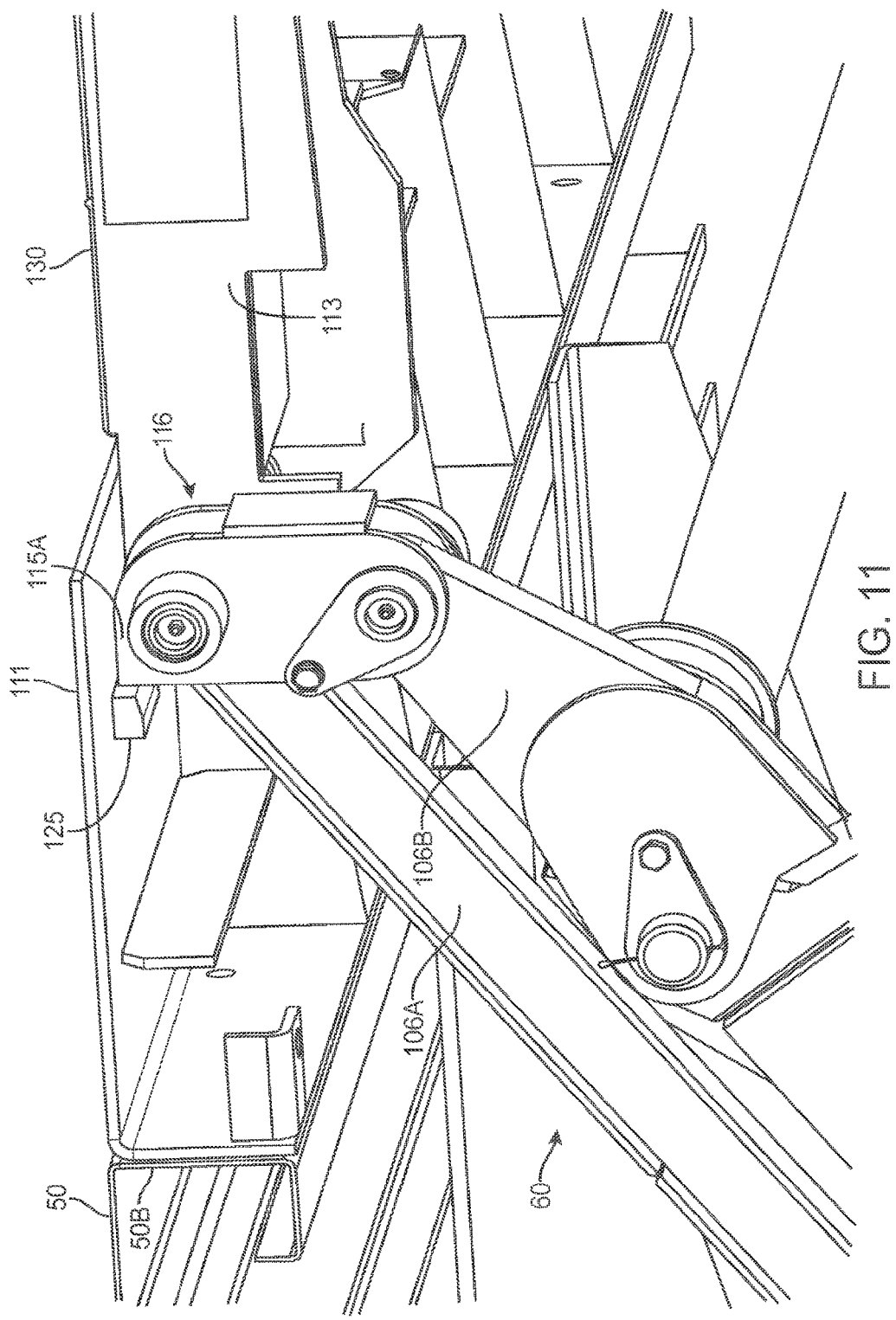
FIG. 11 shows a partial bottom left side perspective view of the lift gate shown in FIG. 9, in accordance with an embodiment of the invention.

FIG. 10 shows a top view of the lift gate system 100, with the lift platform 130 in fully raised position. The load-carrying surfaces of the lift gate 100 comprise said lift platform 130 which, in one embodiment, includes a platform section 112 (FIG. 10) and a foldable section ("flipover") 132 rotatably coupled to the platform section 112. The platform section 112 has a first edge 112A and a second edge to which the flipover 132 is pivotally coupled. The lift platform 130 is used to lift payloads from one level (e.g., the ground level 200) up to another level (e.g., the vehicle bed 50 of the vehicle 70), or vice versa.

Embodiments of the invention are useful in different types of lift gate systems. In one embodiment described herein, the lift gate 100 is a stow-away lift gate. The lift gate 100 further comprises said lifting mechanism 60 for raising, lowering, and stowing the lift gate 100. The flipover 132 is folded onto the platform section 112 during stowing of the lift gate 100.

Figure 15:
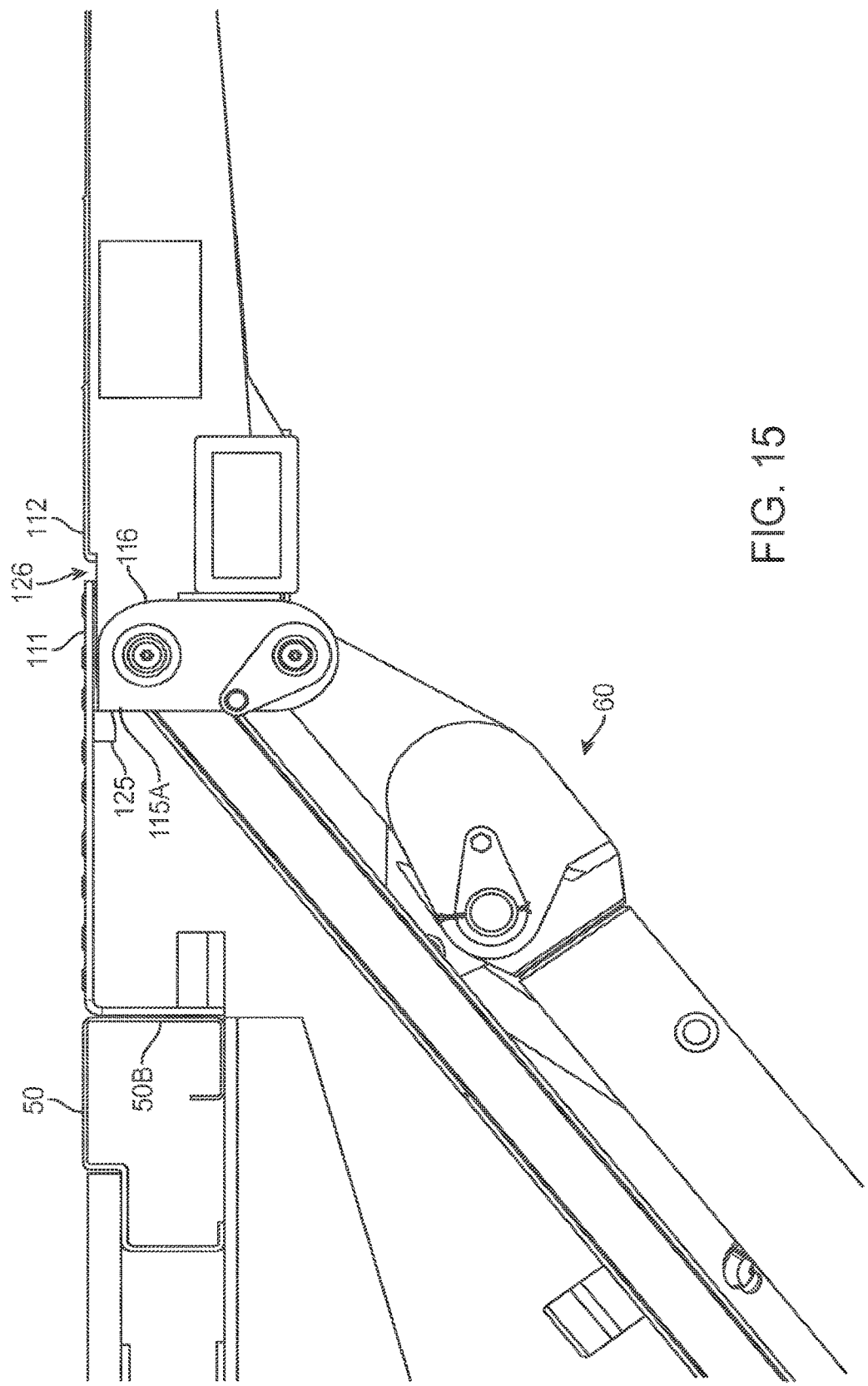
FIG. 15 shows another left side view of the lift gate shown in FIG. 9, with the lift platform in the fully raised position, in accordance with an embodiment of the invention.
Figure 16:
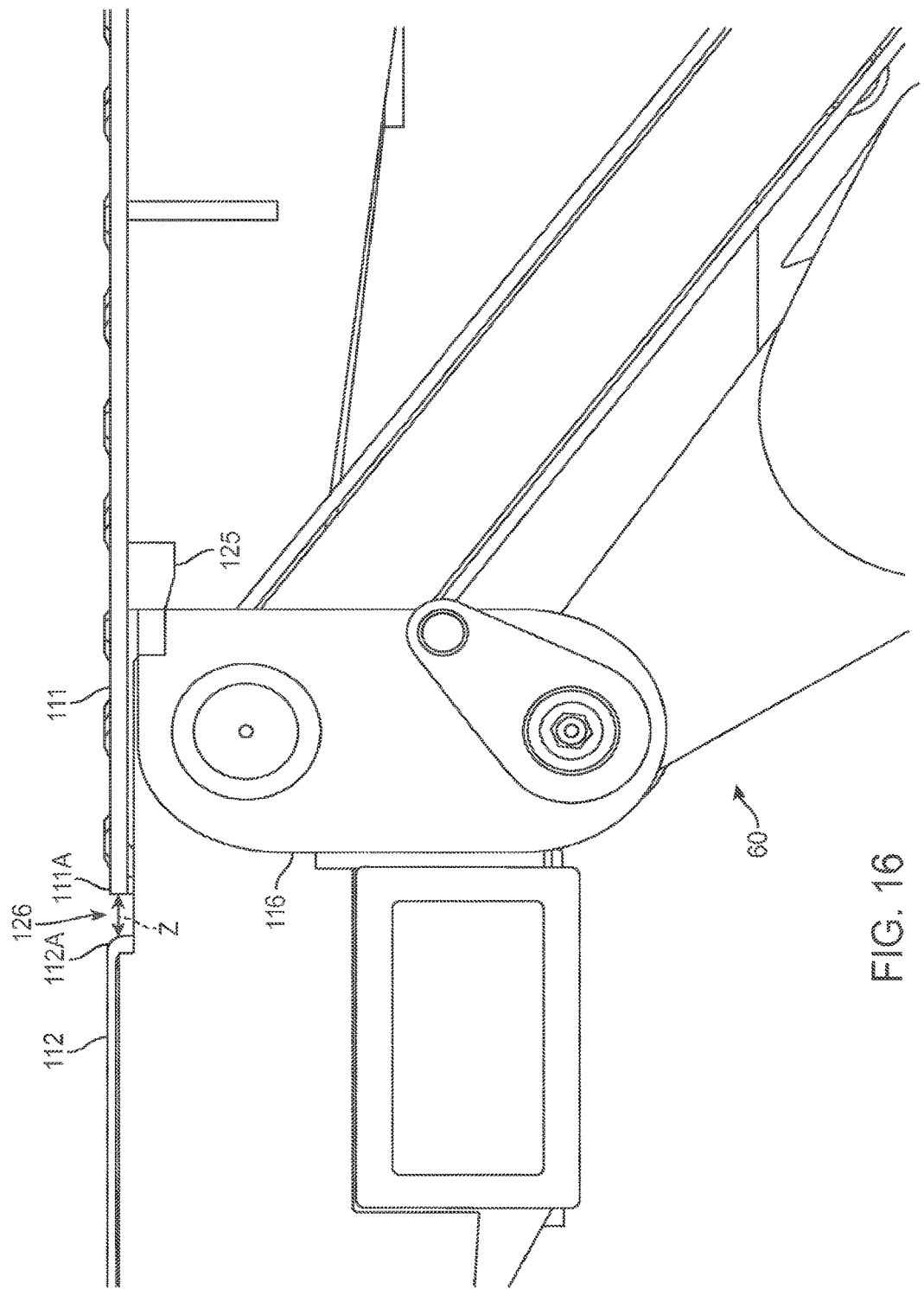
FIG. 16 shows a right side view of the lift gate shown in FIG. 9, with the lift platform in the fully raised position, in accordance with an embodiment of the invention.

In FIG. 9, the lift platform 130 is shown in the raised position, wherein the platform section 112 is substantially aligned with the extension plate 111. As shown in FIG. 11 due to the action of one or more stop members 125, the first edge 112A of the platform section 112 is not in direct contact (i.e., not flush) with the first edge 111A of the extension plate 111, as also shown in FIGS. 14-16.

As such, there is a gap (i.e., spacing) 126 between the first edge 112A of the platform section 112 and the first edge 111A of the extension plate 111 when the platform section 112 is in the fully raised position (as shown in FIG. 9).

Figure 14:
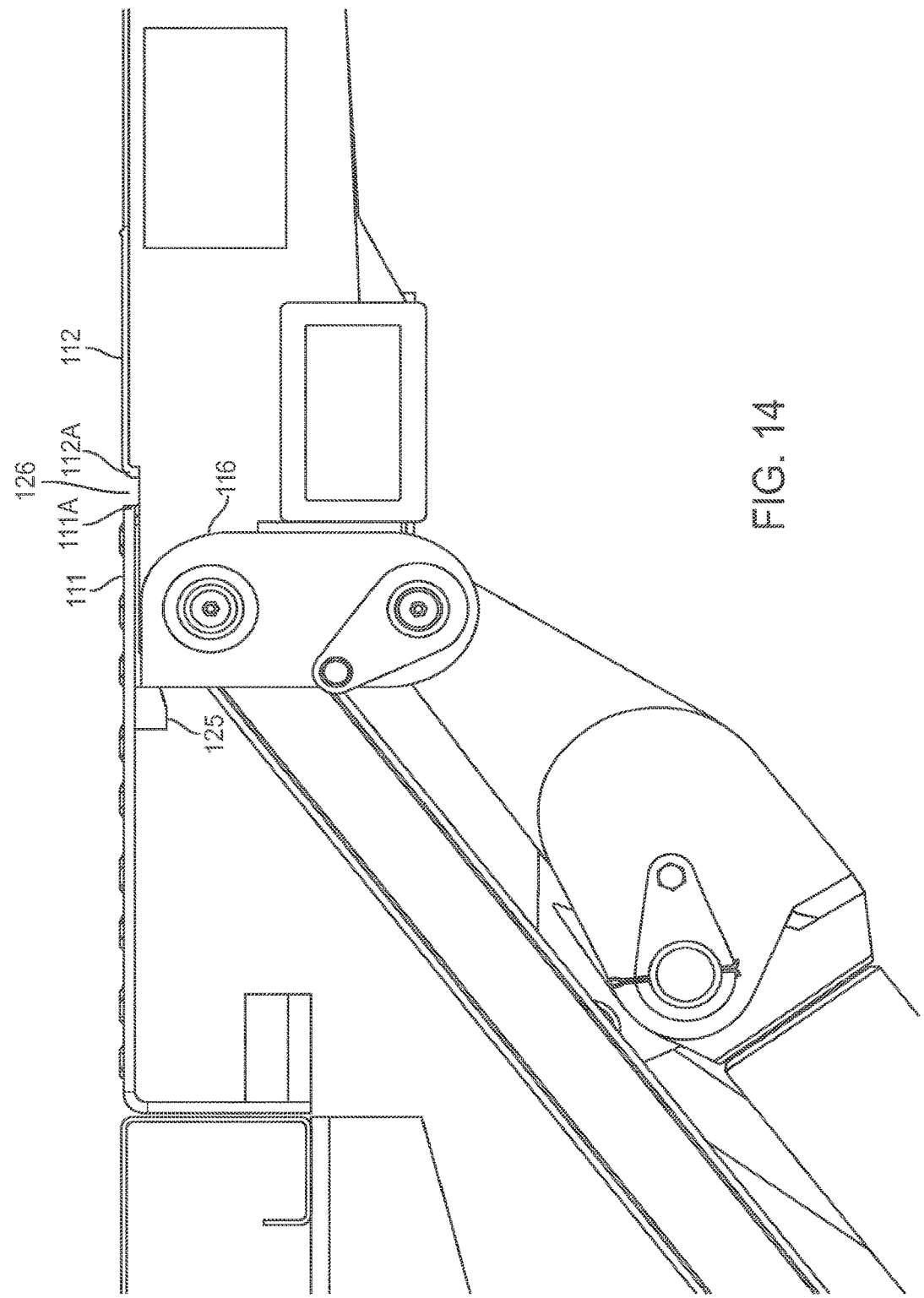
FIG. 14 shows a left side view of the lift gate shown in FIG. 9 along with a shackle member and corresponding stop member under the extension plate, with the lift platform in the fully raised position, in accordance with an embodiment of the invention.

FIG. 14 shows a left side view of the lift gate system 100 including an elongate shackle member 116 and a corresponding stop member 125 under the extension plate 111, wherein the lift platform 130 is in the fully raised position. FIG. 15 shows another left side view of the lift gate system 100, with the lift platform 130 in the fully raised position. FIG. 16 shows a right side view of the lift gate system 100, with the lift platform 130 in the fully raised position.

As described in detail later herein, the stop members 125 act as a buffer between the extension plate 111 and the platform section 112. The stop members 125 prevent direct impact between corresponding edges of the extension plate 111 and the platform section 112 when the platform is rotated to the raised position to be aligned with the extension plate 111.

In one embodiment, said one or more stop members 125 provide said gap 126 between the first edge 112A of the platform section 112 and the first edge 111A of the extension plate 111 when the platform section 112 is in the raised position.

Figure 12:
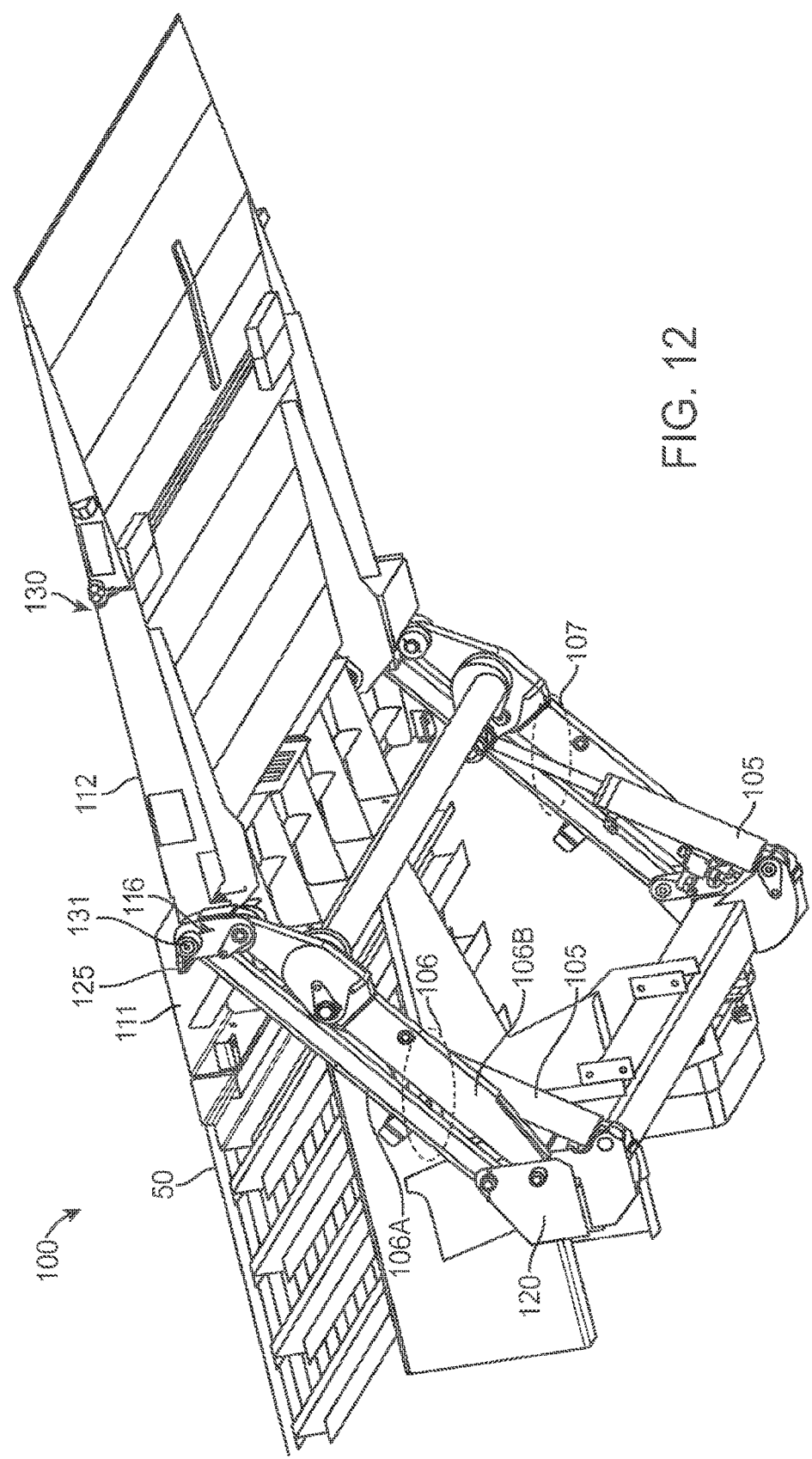
FIG. 12 shows a left side bottom perspective view of the lift gate shown in FIG. 9, with the lift platform in fully raised position, in accordance with an embodiment of the invention.

FIG. 12 shows a left side bottom perspective view of the lift gate system 100, with the lift platform 130 in the fully raised position. In one embodiment shown in FIG. 12, the lifting mechanism 60 of the lift gate 100 comprises a hydraulic system with linkages.

Figure 13:
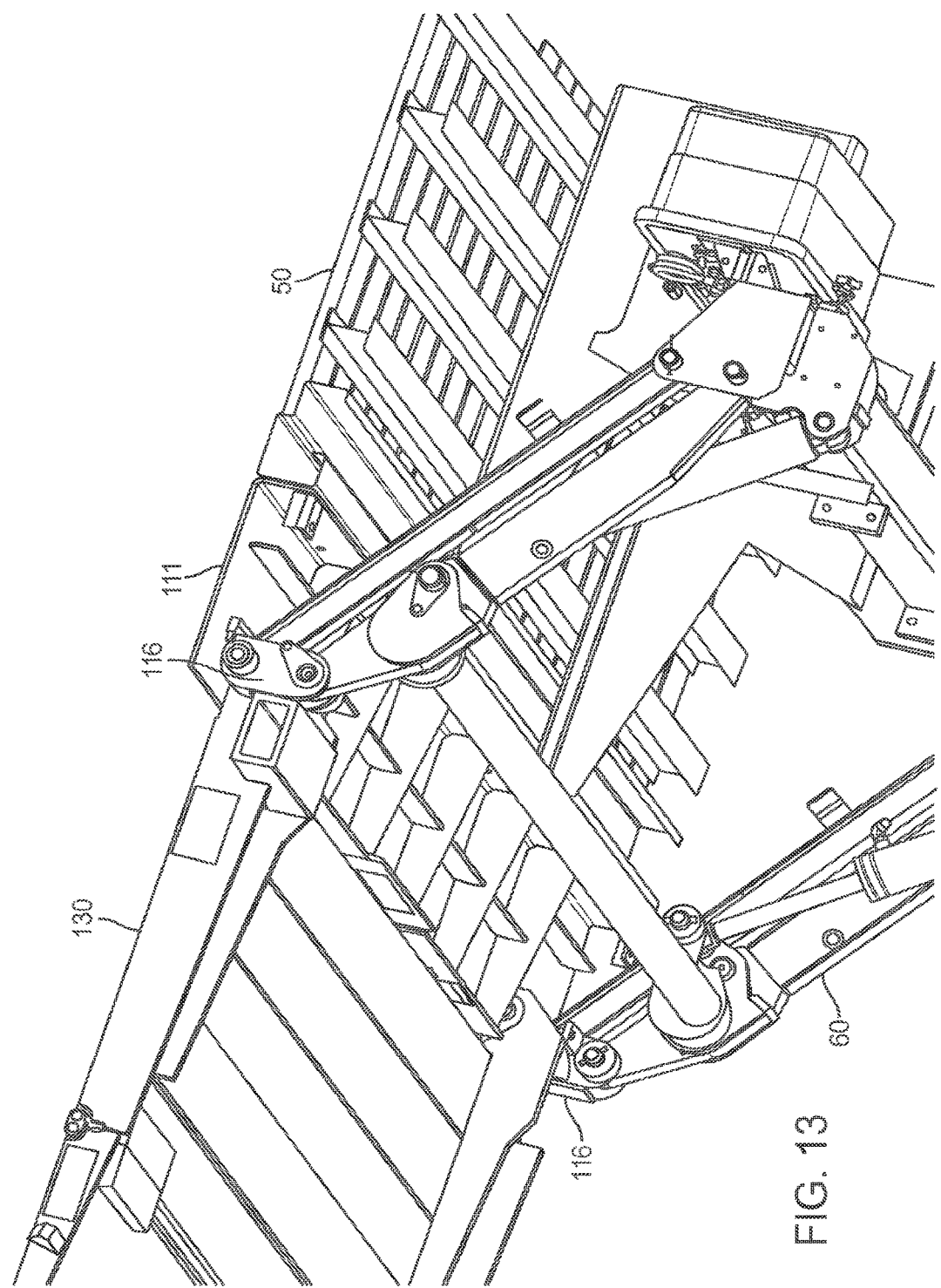
FIG. 13 shows a right side bottom perspective view of the lift gate shown in FIG. 9, with the lift platform in the fully raised position, in accordance with an embodiment of the invention.

FIG. 13 shows a right side bottom perspective view of the lift gate system 100, with the lift platform 130 in the fully raised position. For example, the lifting mechanism 60 comprises a pair of hydraulic cylinders 105, a first pair of parallelogram linkage arms 106, and a second pair of parallelogram linkage arms 107. The pair of hydraulic cylinders 105 actuates the raising, lowering, and stowing of the lift gate 100.

The linkages 106 and 107 support the lift platform 130 as the lift gate 100 is raised, lowered, or stowed. The linkages 106 and 107 maintain the lift platform 130 in a substantially horizontal plane relative to the ground level 200 as the lift platform 130 is raised/lowered. The lift platform 112 follows an arc when travelling between the lowered position and the raised position, due to actions of the parallelogram lifting mechanism.

Figure 26:
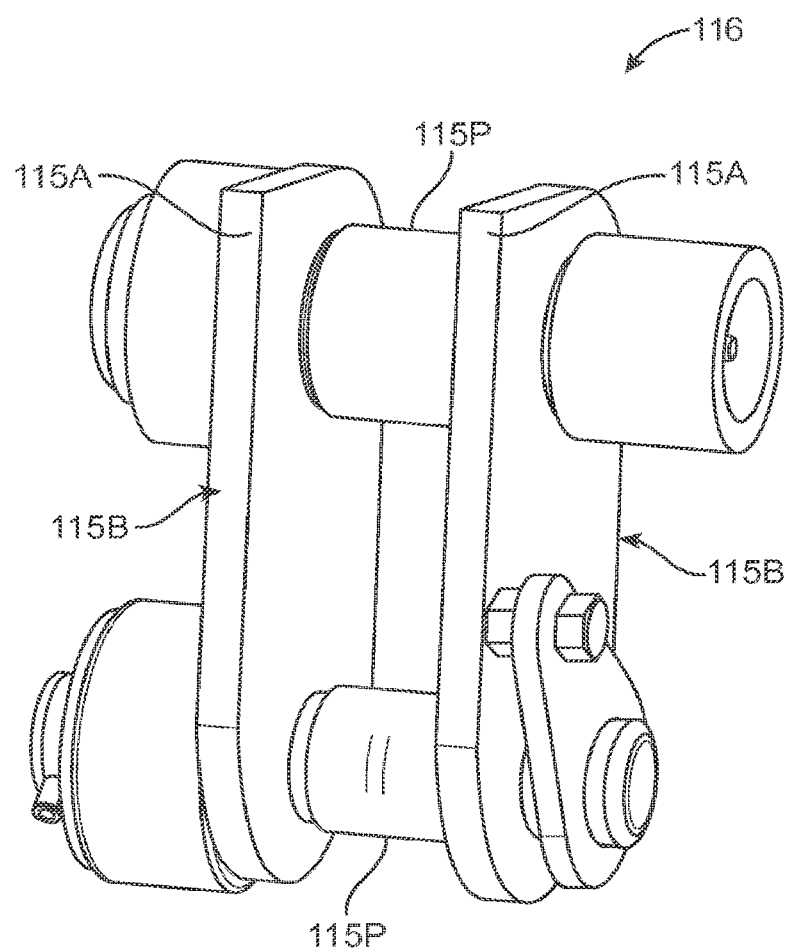
FIG. 26 shows a front perspective view of a shackle member of the lift gate shown in FIG. 9, in accordance with an embodiment of the invention.

The platform section 112 is pivotably mounted for rotation on at least one pivot point 131 (i.e., upper pivot axis member 115P in FIG. 26). During stowing of the lift gate 100, the linkages 106 and 107 and the hydraulic cylinders 105 rotate the lift platform 130 about at least one pivot point 131.

The shape of the stop members 125 may vary. In one embodiment, the stop members 125 are substantially block shaped. For example, each stop member 125 has a width that is approximately 0.63 inches (about 1.60 centimeters), a height that is approximately 0.375 inches (about 0.95 centimeters), and a length that is approximately 1.5 inches (about 3.81 centimeters). The present invention is not limited to a stop member 125 with the example width, height, and length provided.

The shackle members 116 are connecting elements (links) that interconnect the platform section 112 with the lifting mechanism 60. For example as shown in FIG. 11, a shackle member 116 pivotally connects linkage members 106A and 106B at one end of the shackle member, while a fixed plate 120 shown in FIG. 12 pivotally connects linkage members 106A and 106B at the other end of the shackle member, forming a portion of the parallelogram linkage mechanism 60. The plate 120 is fixed to the vehicle/lift frame and remains stationary, while the shackle member 116 moves as the lift platform 130 is raised/lowered by the linkage mechanism 60.

Figure 21:
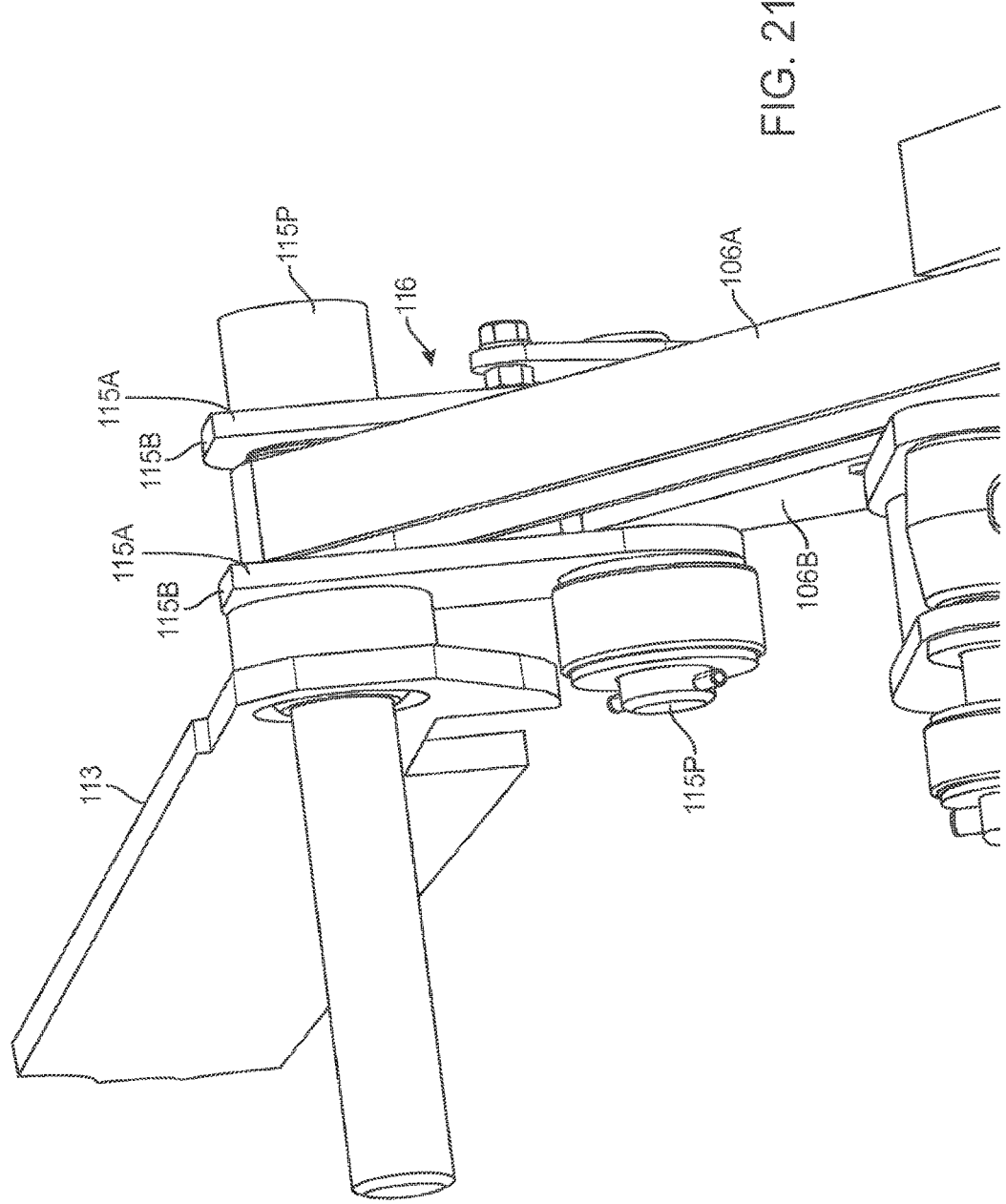
FIG. 21 shows a front perspective view of a shackle member of the lift gate shown in FIG. 9, in relation to the linkages of the lifting mechanism, in accordance with an embodiment of the invention.

The lift gate 100 further comprises support brackets 113, as shown in FIG. 21, extending longitudinally along the underside of the platform section 112, to support the platform section 112. The support brackets 113 support the platform section 112 when the lifting mechanism 60 raises or lowers the lift platform 130. The support brackets 113 further connect the platform section 112 to connecting links of the lift gate 100, such as shackle members 116.

As shown, each shackle member 116 further has at least one shackle extension 115A, according to an embodiment of the invention, wherein the shackle extensions 115A are configured for direct contact with the stop members 125 when the lift platform 130 is raised to the fully raised position.

In one embodiment, the stop members 125 are positioned under the extension plate 111, such as by welding the stop member 125 underneath the extension plate 111. The stop members 125 are positioned to be aligned with the shackle extensions 115A. The stop members 125 are positioned under the extension plate 111 in relation (i.e., proximate) to the edge 111A of the extension plate 111 to make contact with the shackle extensions 115A as the platform 130 is raised to the fully raised position, preventing the edges 112A and 111A from contacting one another to provide the gap 126.

In one embodiment the present invention provides a method comprising: (1) mounting a lift gate 100 on a vehicle, wherein the lift gate 100 is slidably supported on rails under the vehicle bed, (2) providing a space between the extension plate 111 and the lift platform 130 while the lift platform 130 is in a raised position and aligned with the extension plate, (3) positioning at least one stop member 125 on the extension plate 111 to provide said gap 126, and (4) sliding the lift gate 100 on said rails towards the vehicle to reduce said space, until said at least one stop member 125 is in contact with a corresponding shackle extension 115A, thereby providing said gap 126 between the platform 130 and the extension plate 111, while the lift platform 130 is substantially aligned with the extension plate 111 and the lift platform 130 is in the raised position.

Position of the stop members 125 under the extension plate 111 in this manner is selected based on dimensions of the extension plate 111 and position of the shackle members 116, such that the stop members 125 and corresponding shackle extensions 115A make direct contact, and prevent the edges 112A and 111A from contacting one another when the platform 130 is raised to the fully raised position (while the platform 130 is aligned with the vehicle bed). The stop members 125 and shackle extensions 115A provide said gap 126 between the edge of the extension plate 111 and the edge of the lift platform 130 when the lift platform 130 is in the fully raised position.

Figure 17:
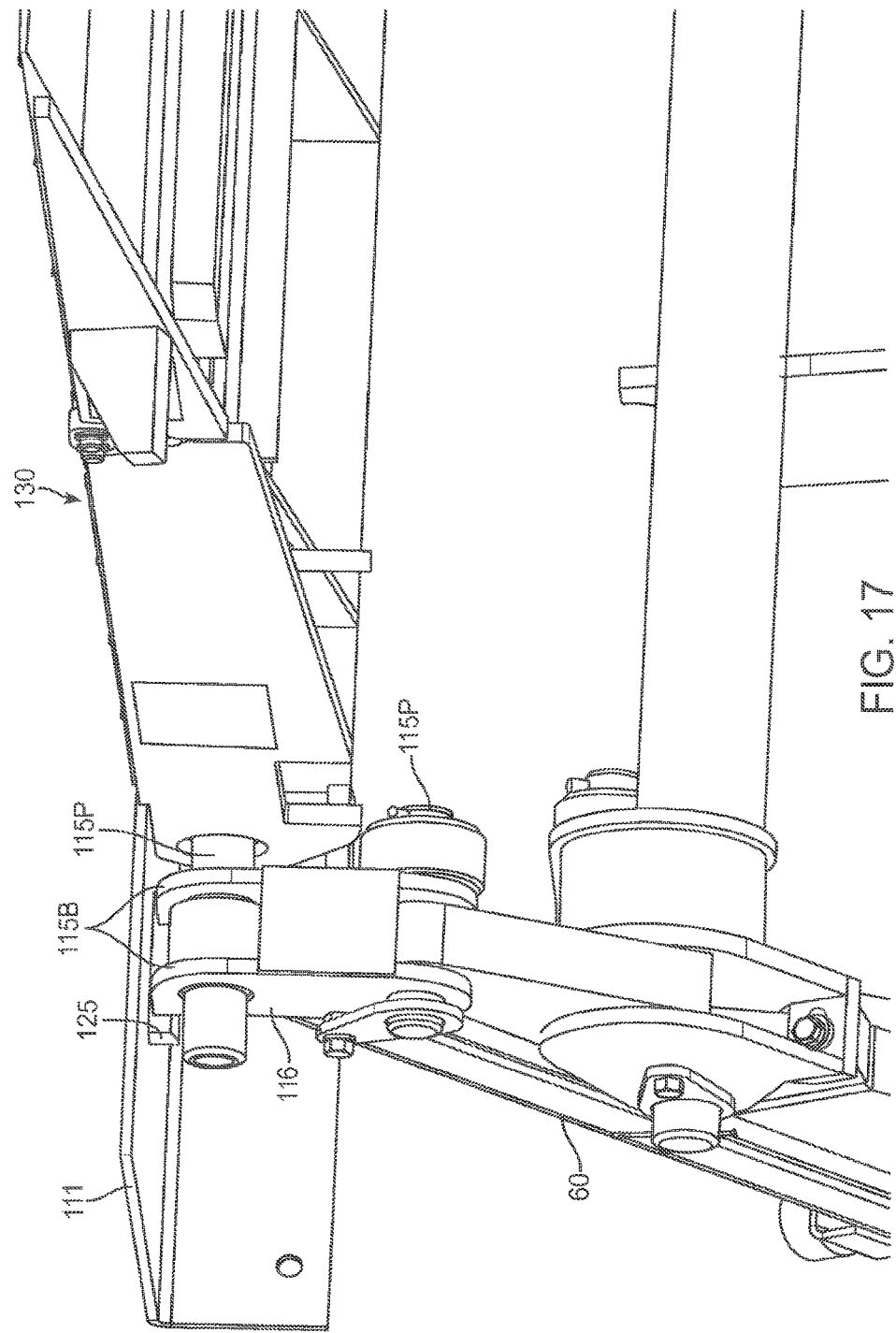
FIG. 17 shows a bottom left side perspective view of the lift gate shown in FIG. 9, with the platform proximate to but not in the fully raised position, in accordance with an embodiment of the invention.
Figure 18:
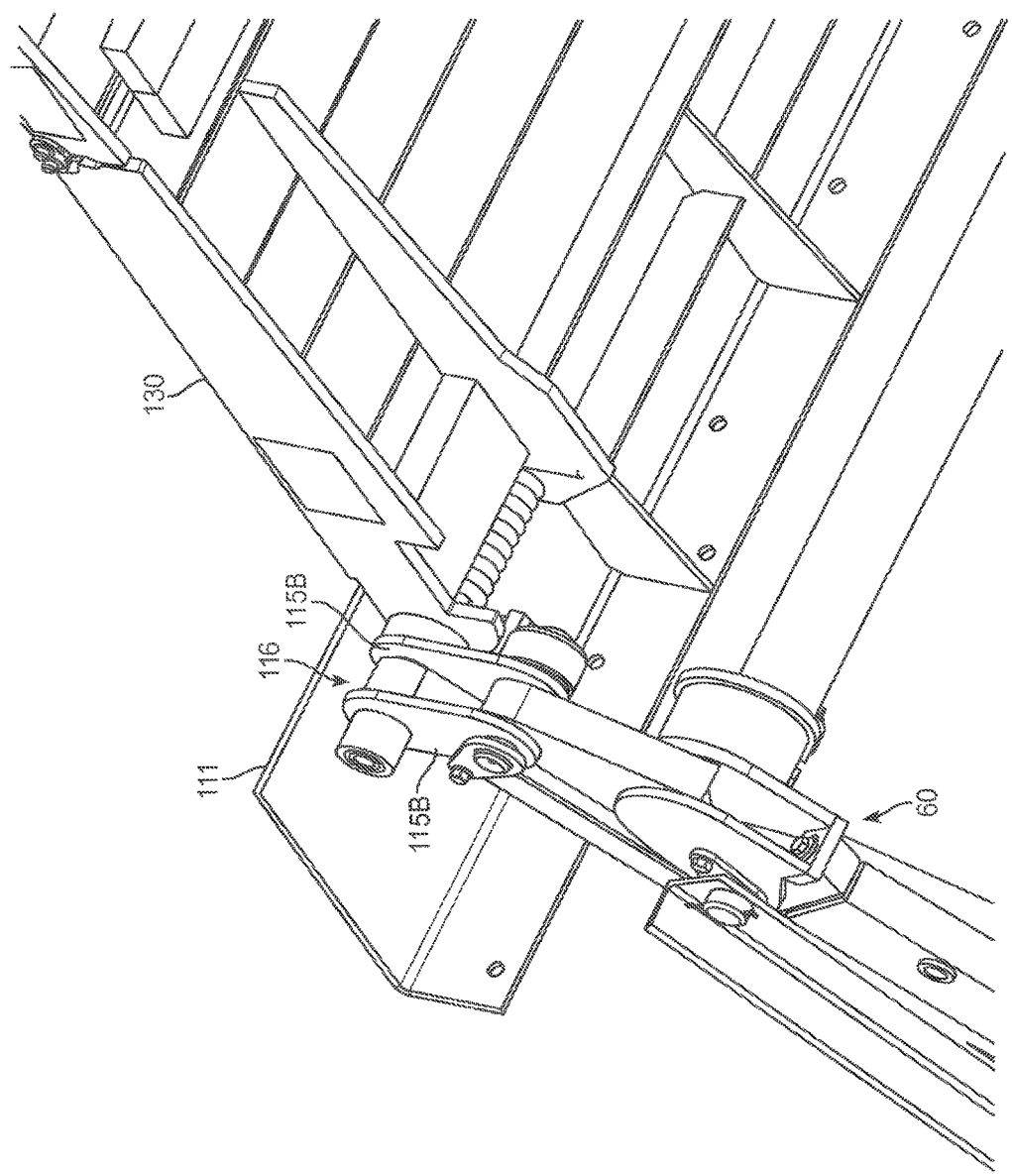
FIG. 18 shows another bottom left side perspective view of the lift gate shown in FIG. 9, with the platform in the fully raised position, in accordance with an embodiment of the invention.
Figure 19:
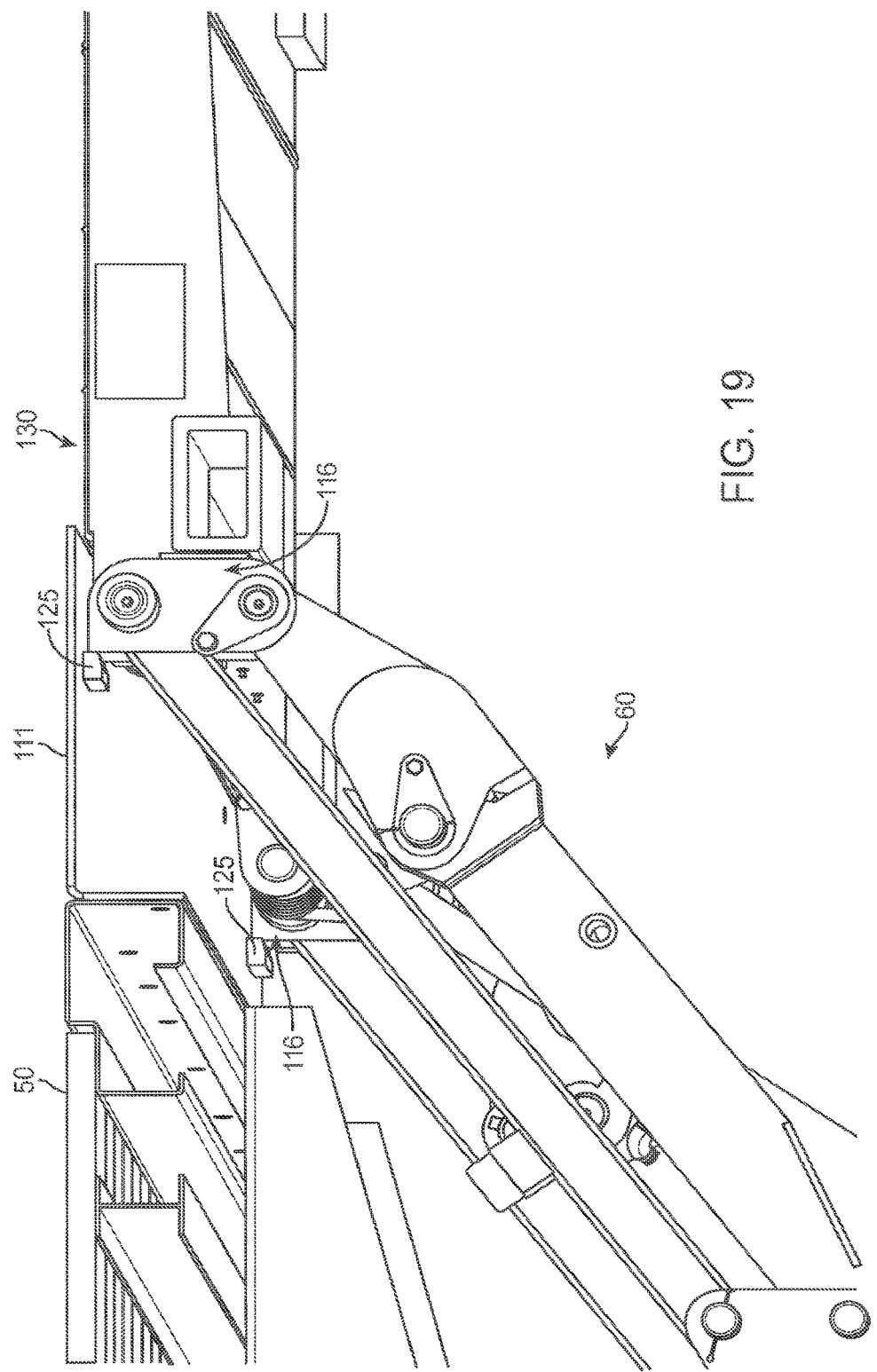
FIG. 19 shows a left side perspective of the lift gate shown in FIG. 9, with the platform proximate to but not in the fully raised position, in accordance with an embodiment of the invention.
Figure 20:
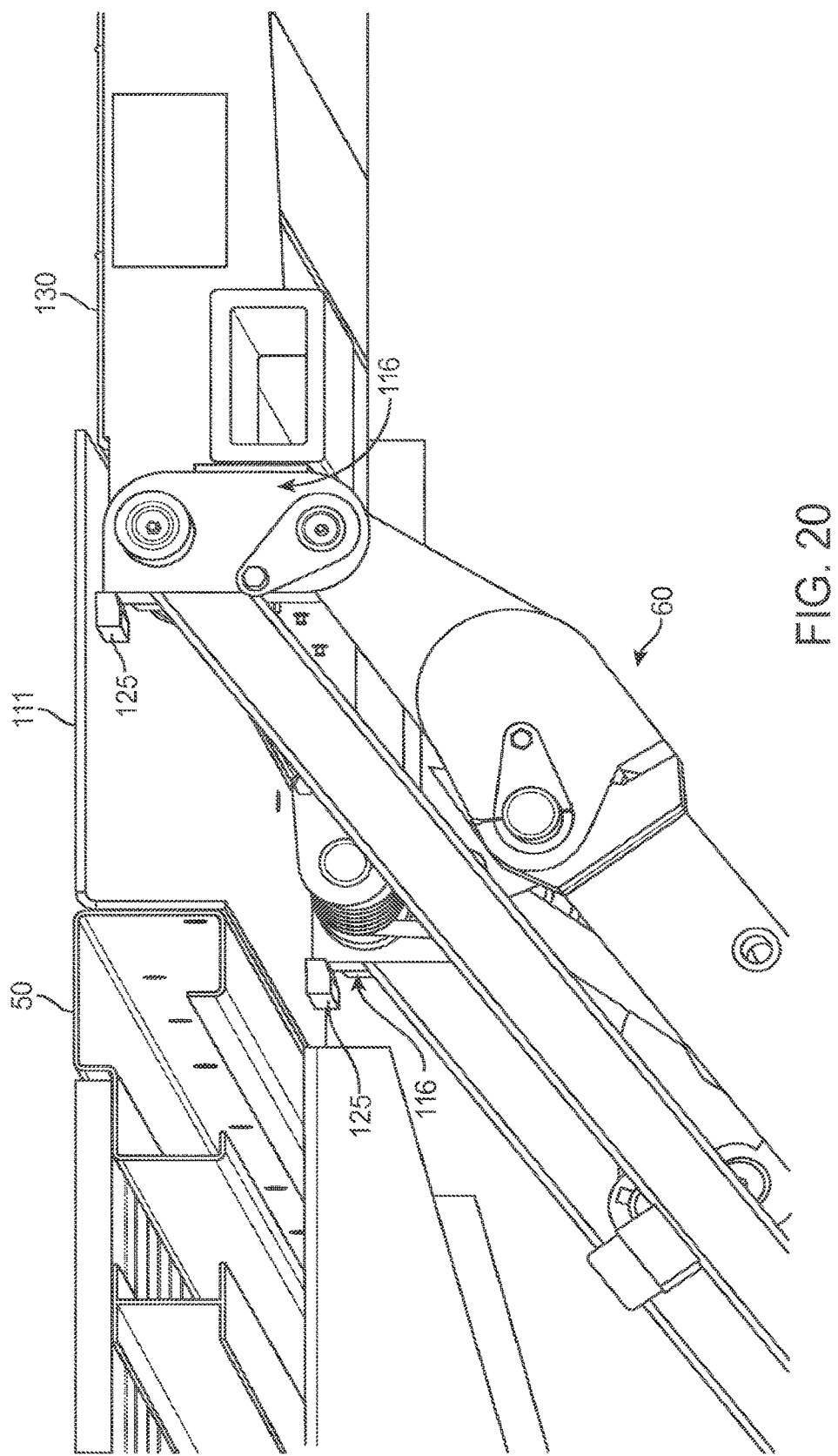
FIG. 20 shows another left side perspective view of the lift gate shown in FIG. 9, with the platform proximate to but not in the fully raised position, in accordance with an embodiment of the invention.

FIG. 17 shows a bottom left side perspective view of the lift gate shown in FIG. 9, with the platform 130 proximate to but not in the fully raised position, in accordance with an embodiment of the invention. FIG. 18 shows another bottom left side perspective view of the lift gate shown in FIG. 9, with the platform 130 in the fully raised position, in accordance with an embodiment of the invention. FIG. 19 shows a left side perspective view of the lift gate of FIG. 9, with the platform 130 proximate to but not in the fully raised position, in accordance with an embodiment of the invention. FIG. 20 shows another left side perspective view of the lift gate of FIG. 9, with the platform 130 proximate to but not in the fully raised position, in accordance with an embodiment of the invention.

Figure 22:
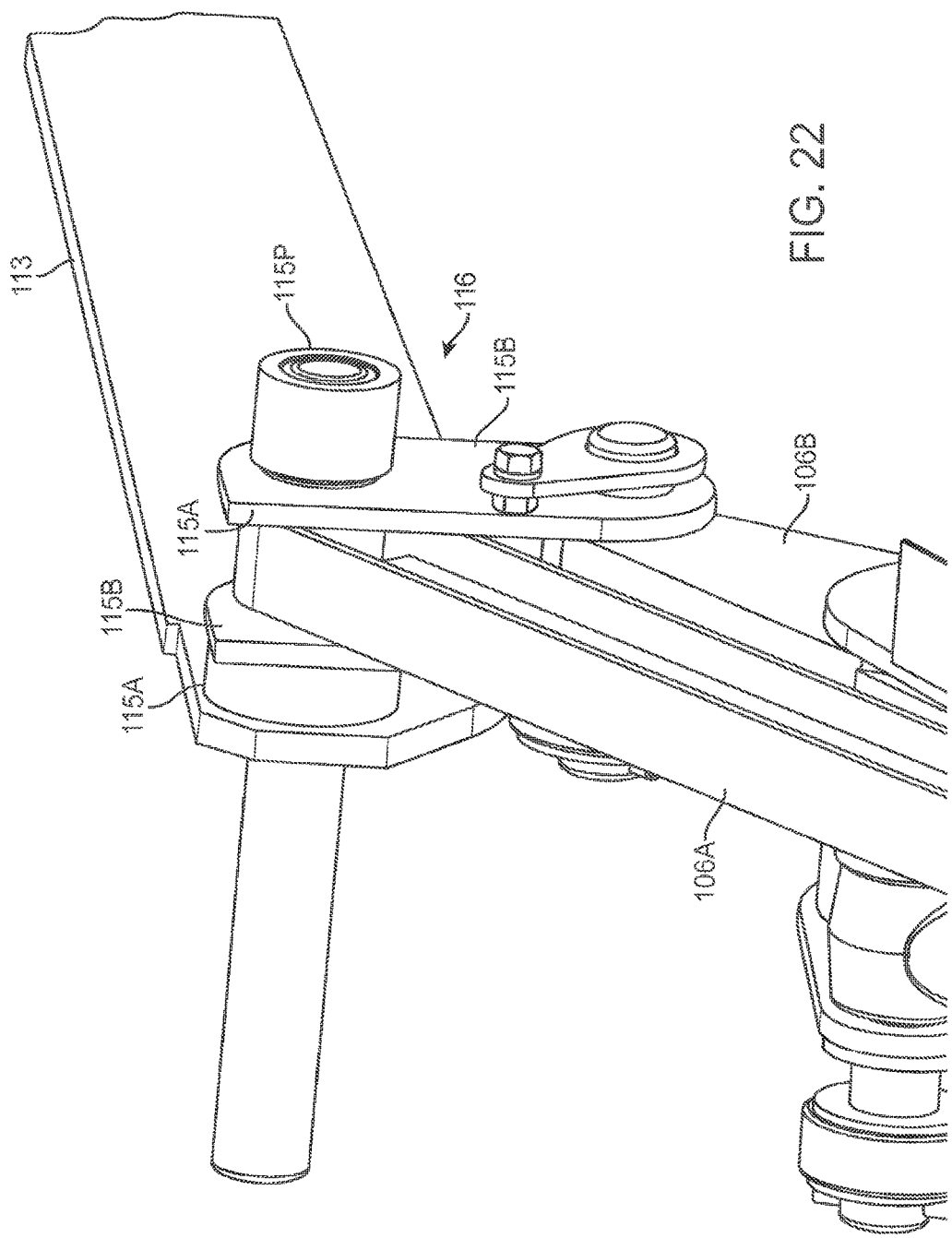
FIG. 22 shows another front perspective view of a shackle member of the lift gate shown in FIG. 9, in relation to the linkages of the lifting mechanism, in accordance with an embodiment of the invention.

FIG. 21 shows a front perspective view of a shackle member 116, in relation to the linkages 106A, 106B of the lifting mechanism 60, according to an embodiment of the invention. FIG. 22 shows another front perspective view of the shackle member 116, in relation to the linkages 106A, 106B of the lifting mechanism 60.

Figure 23:
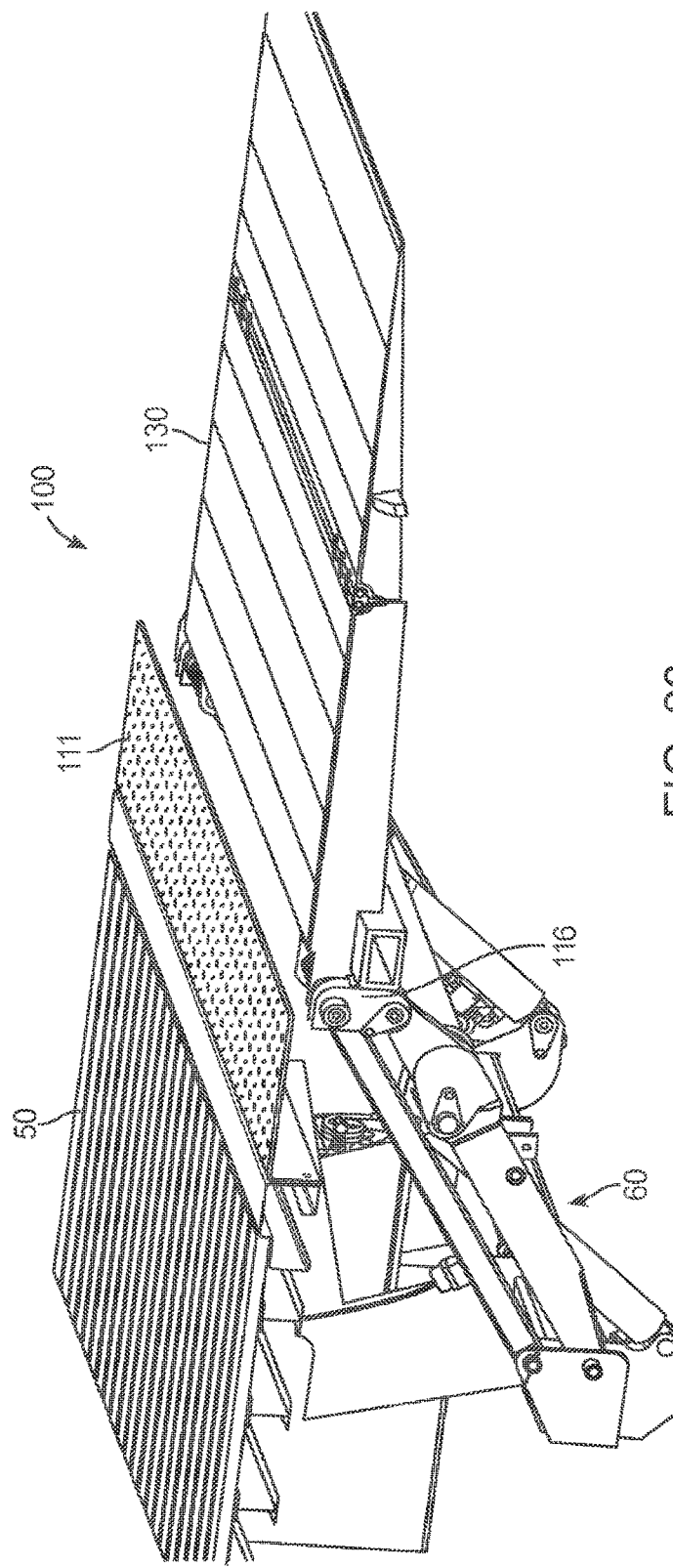
FIG. 23 shows a left side perspective view of the lift gate shown in FIG. 9, with the lift platform proximate to but not in the fully raised position, in accordance with an embodiment of the invention.
Figure 24:
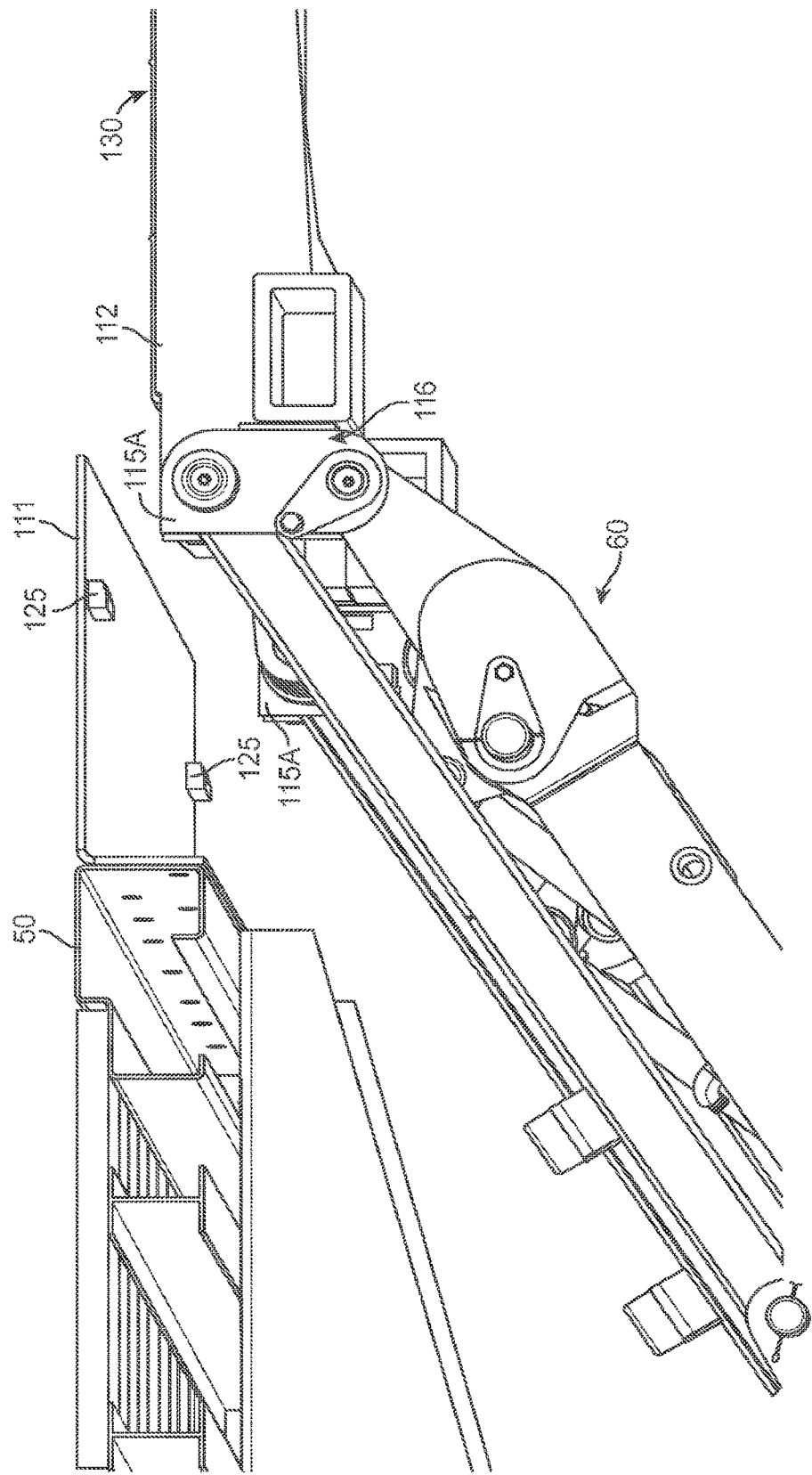
FIG. 24 shows a left side bottom perspective view of the lift gate shown in FIG. 9, with the lift platform proximate to but not in the fully raised position, in accordance with an embodiment of the invention.
Figure 25:
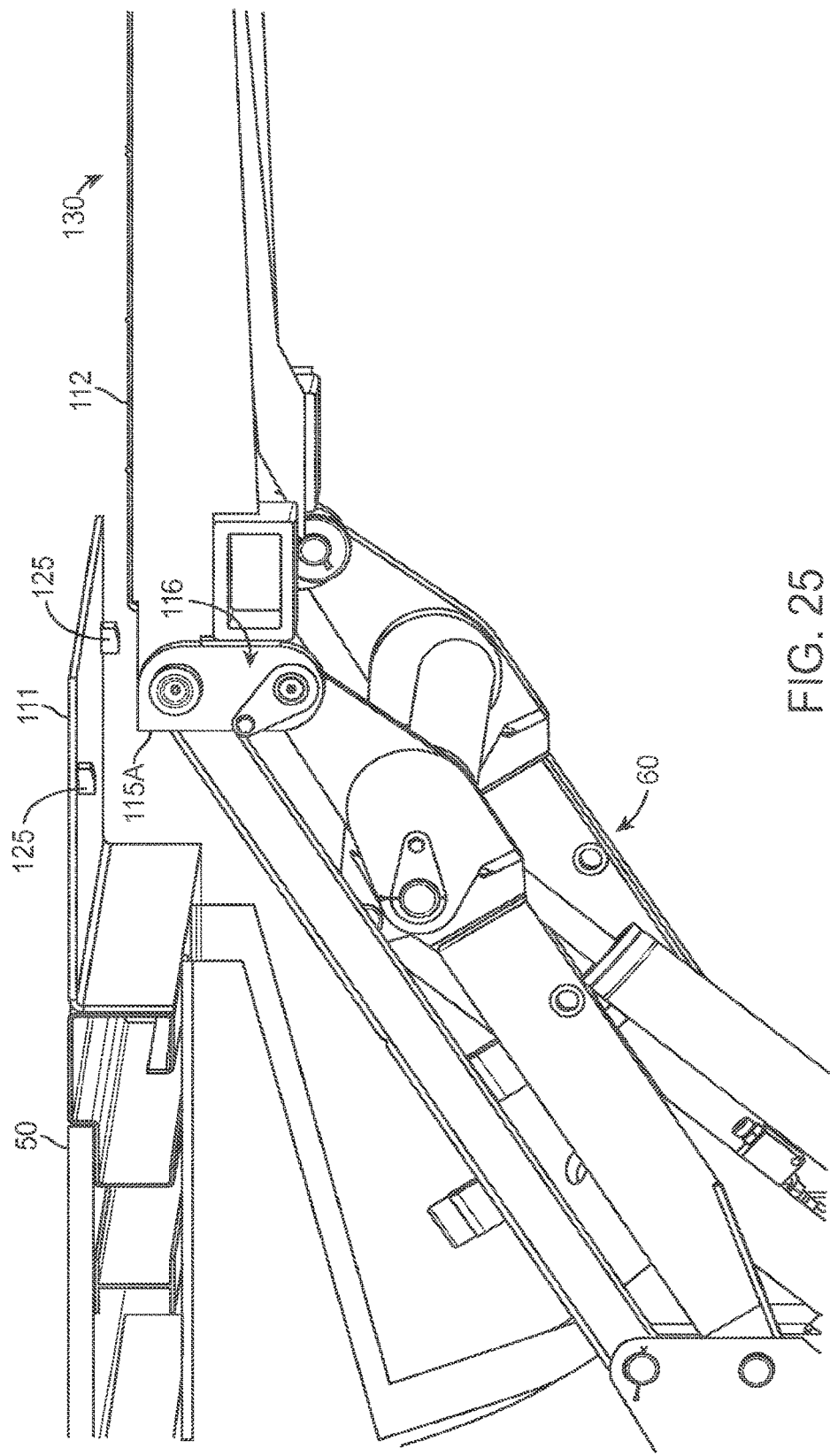
FIG. 25 shows another left side bottom perspective view of the lift gate shown in FIG. 9, with the lift platform proximate to but not in the fully raised position, in accordance with an embodiment of the invention.

For example, FIGS. 23-25 show the lift platform 130 as it travels between the fully raised position and the fully lowered position. FIG. 23 shows a left side perspective view of the lift gate system 100, with the lift platform 130 not in the fully raised position. FIG. 24 shows a left side bottom perspective view of the lift gate system 100, with the lift platform 130 not in the fully raised position. FIG. 25 shows another left side bottom perspective view of the lift gate system 100, with the lift platform 130 not in the fully raised position.

The stop members 125 prevent direct impact between edge 111A of the extension plate 111 and edge 112A of the platform section 112 when the platform is rotated to the raised position to be horizontally aligned with the extension plate 111. Although in this example, each stop member 125 is positioned under the extension plate 111, as described further below the stop members can be positioned elsewhere on the lift gate to provide the gap 126.

In one embodiment shown in the drawings, the stop members 125 are attached to the extension plate 111 and may be welded directly under the extension plate 111. The stop members 125 provide the gap 126 between the edge 112A of the platform section 112 and the edge 111A of the extension plate 111 when the platform section 112 is in the raised position.

In one embodiment, as shown in FIG. 16, the gap 126 has a width z between 0.50 inches (about 1.27 centimeters) and 0.63 inches (about 1.60 centimeters). The example numerical range provided for the width z of the gap 126 is an approximate numerical range only, and the present invention is not limited to gaps with a width within this numerical range.

Without the stop members 125, the edge 112A of the platform section 112 impacts against the edge 111A of the extension plate 111 when the platform section 112 is raised from the lowered position to the raised position. The direct impact between the extension plate 111 and the platform section 112 may cause the extension plate 111 and/or the platform section 112 to buckle and be damaged.

Therefore, the stop members 125 and shackle extensions 115A act as buffers between the extension plate 111 and the platform section 112. The stop members 125 and shackles 115A prevent direct impact between the extension plate 111 and the platform section 112. For example, the stop members 125 and shackle extensions 115A prevent the edge 112A of the platform section 112 from hitting against the edge 111A of the extension plate 111 as the platform section 112 is raised from the lowered position to the raised position.

The stop members 125 may be replaced after wear and tear. For example, the stop members 125 may be replaced with new stop members 125 when the width z of the gap 126 becomes smaller than 0.50 inches (about 1.27 centimeters) because of wear and tear. In one example, the width z of the gap 126 should be approximately 0.63 inches (about 1.60 centimeters) when new stop members 125 are positioned between the platform section 112 and the extension plate 111. In one example, the stop members are made of a rigid material such as metal.

In one embodiment, the lift gate 100 is configured for mounting at a mounting structure. In one embodiment, the mounting structure comprises a rear frame of a vehicle (e.g., a truck). The stop members 125 limit rotational (e.g., inward) movement of the lift platform 130 toward a mounting structure such as said vehicle opening, when the platform section 112 is in the raised position and the platform 130 is at a selected level (e.g., horizontally aligned with a vehicle bed). When used, the extension plate 111 is a component of the mounting structure. For example, the lift gate 100 may be attached to said rear opening 50A of the vehicle bed 50 of the vehicle 70, wherein in one example the vehicle includes said extension plate 111. The extension plate 111 may be coupled (e.g., welded, or removably bolted with screws or nuts and bolts) adjacent to the rear opening 50A of the vehicle bed 50 for extending the depth (reach) of the vehicle bed 50 beyond the rear opening 50A. In another example, when the extension plate 111 is not used, the stop members 125 may be attached e.g. to the periphery of the vehicle opening, to contact the shackles 116 and provide said gap 126 between the platform 112 and vehicle opening.

The stop members 125 limit rotational (e.g., inward) movement of the lift platform 130 toward a mounting structure such as said vehicle opening, when the platform section 112 is in the raised position and the platform 130 is at a selected level, such as horizontally aligned with the vehicle bed. For example, when the extension plate 111 is used, the direct contact between the shackle extensions 115A and stop member 125 restricts platform section 112 from further inward movement towards the extension plate 111 when the platform 130 is raised, thereby maintaining the platform section 112 in substantial alignment with the extension plate 111.

Further, when the platform section 112 is in the raised position, the stop members 125 and shackle extensions 115A help prevent actuating components of the lift gate 100 (e.g., the lifting mechanism 60) from moving the platform section 112 above, and out of substantial horizontal alignment with, the extension plate 111.

FIGS. 26-32 show different views of a shackle member 116, according to embodiments of the invention. The pair of shackle members 116 on the left and right sides of the lift gate system 100 are the same, in this embodiment.

Figure 29:
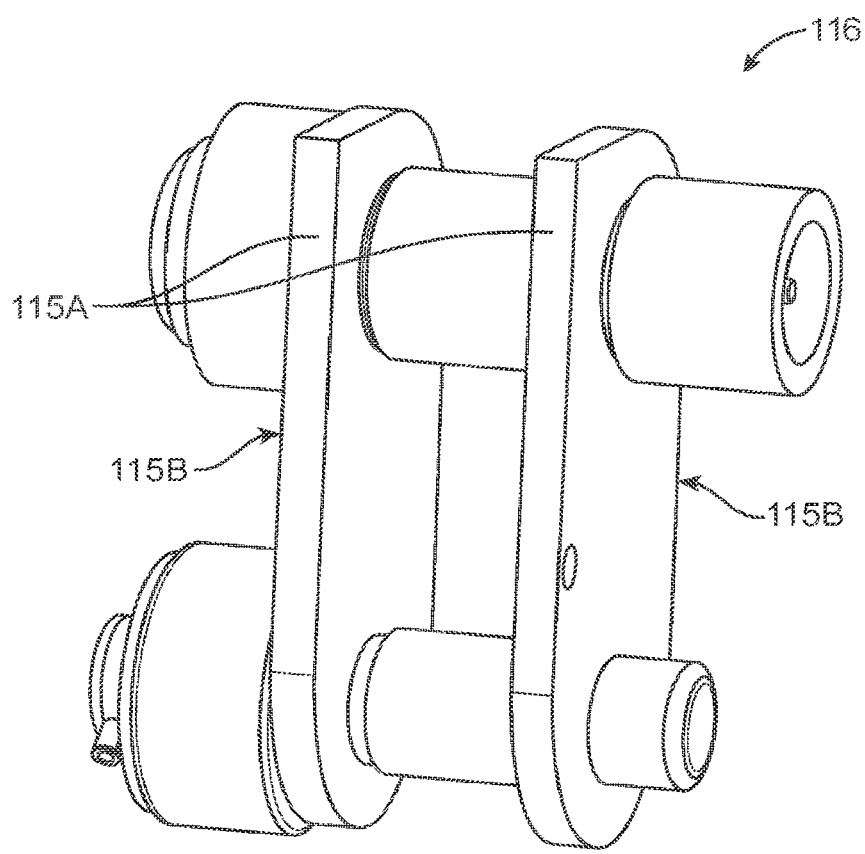
FIG. 29 shows another front perspective view of the shackle member of the lift gate shown in FIG. 9, in accordance with an embodiment of the invention.
Figure 30:
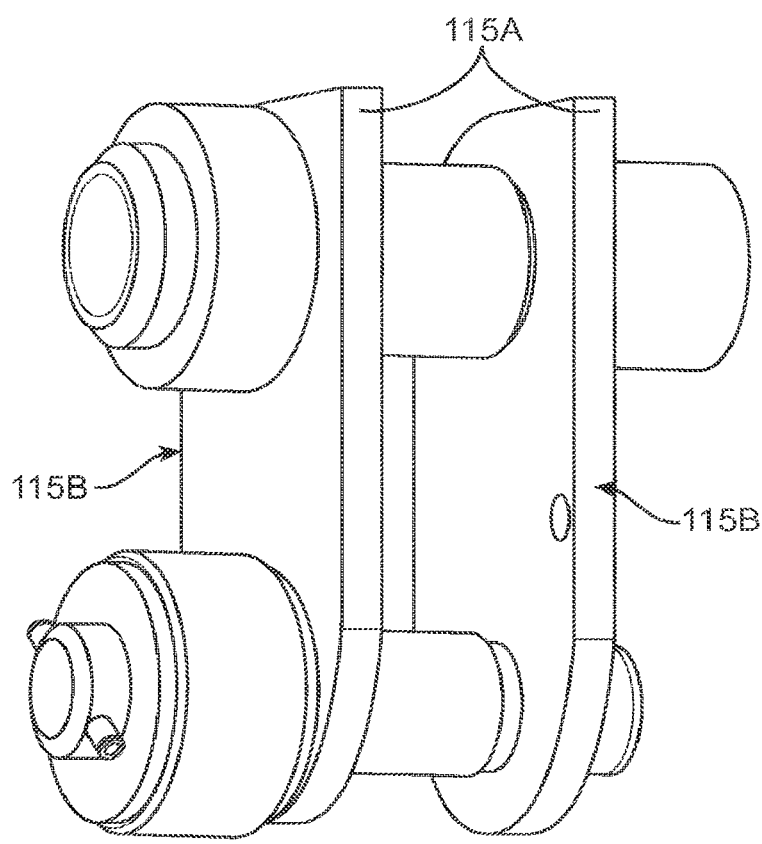
FIG. 30 shows another front perspective view of a shackle member of the lift gate of FIG. 9, in accordance with an embodiment of the invention.

Specifically, FIG. 26 shows a front perspective view of a shackle member 116. FIG. 29 shows another front perspective view of the shackle member 116. FIG. 30 shows another front perspective view of the shackle member 116.

Figure 27:
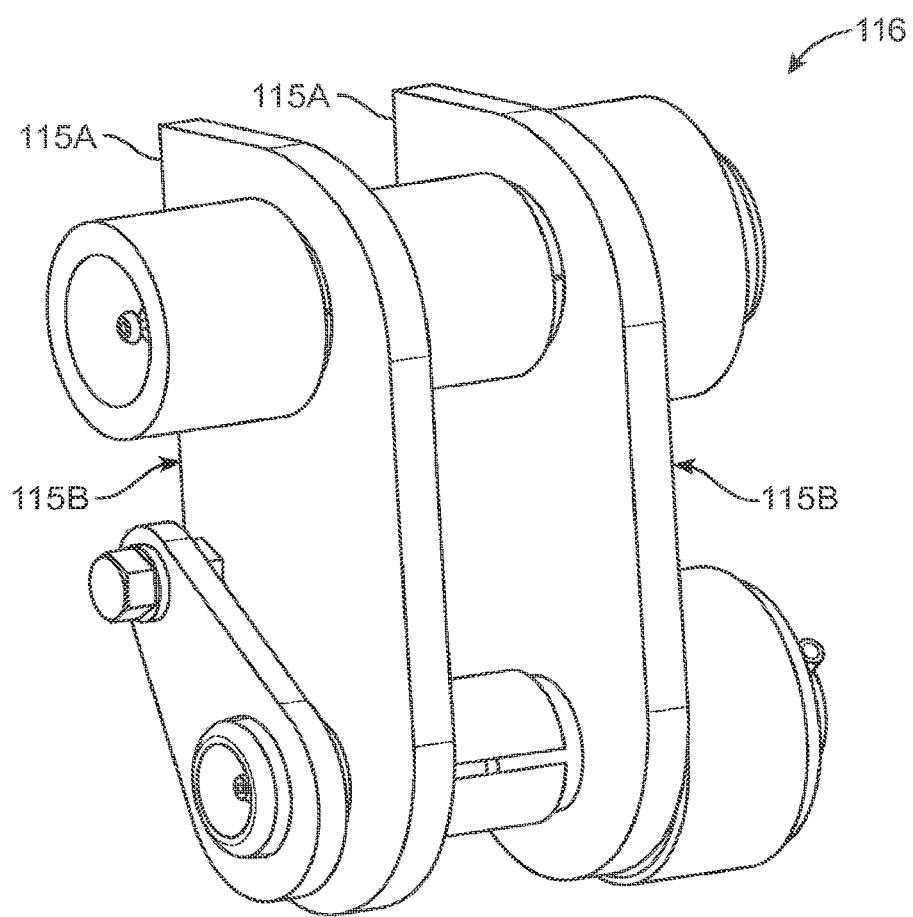
FIG. 27 shows a rear perspective view of a shackle member of the lift gate shown in FIG. 9, in accordance with an embodiment of the invention.
Figure 28:
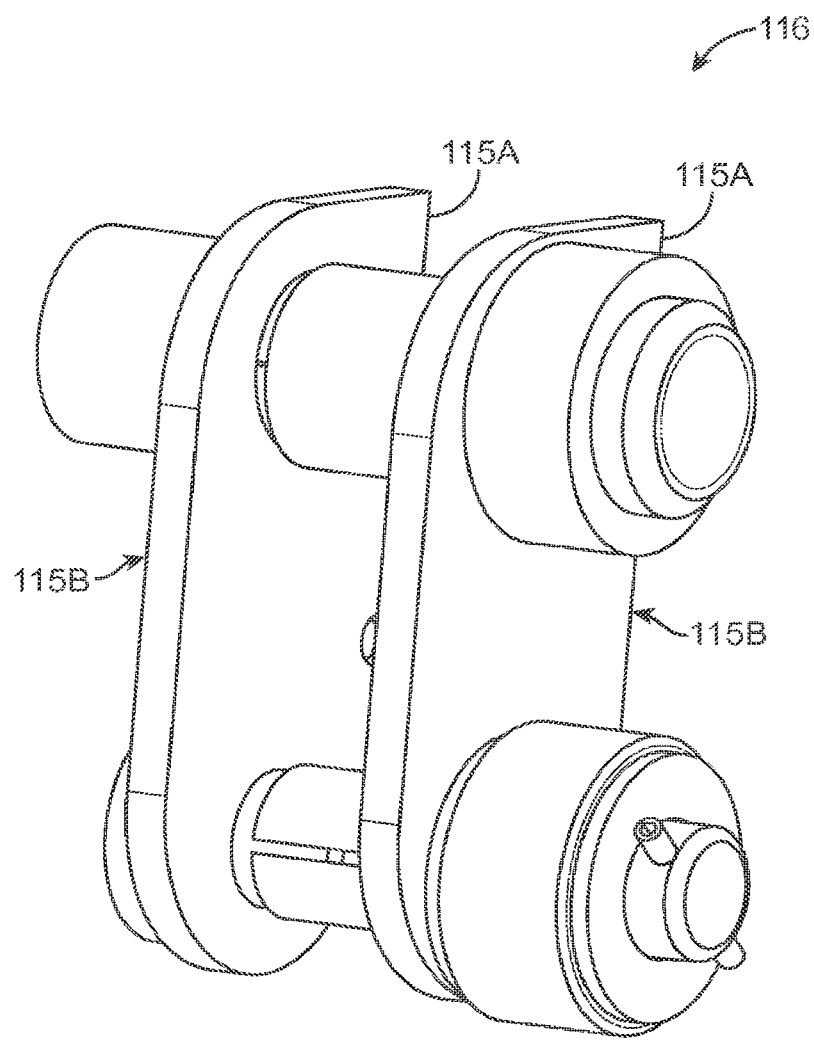
FIG. 28 shows another rear perspective view of the shackle member of the lift gate shown in FIG. 9, in accordance with an embodiment of the invention.
Figure 31:
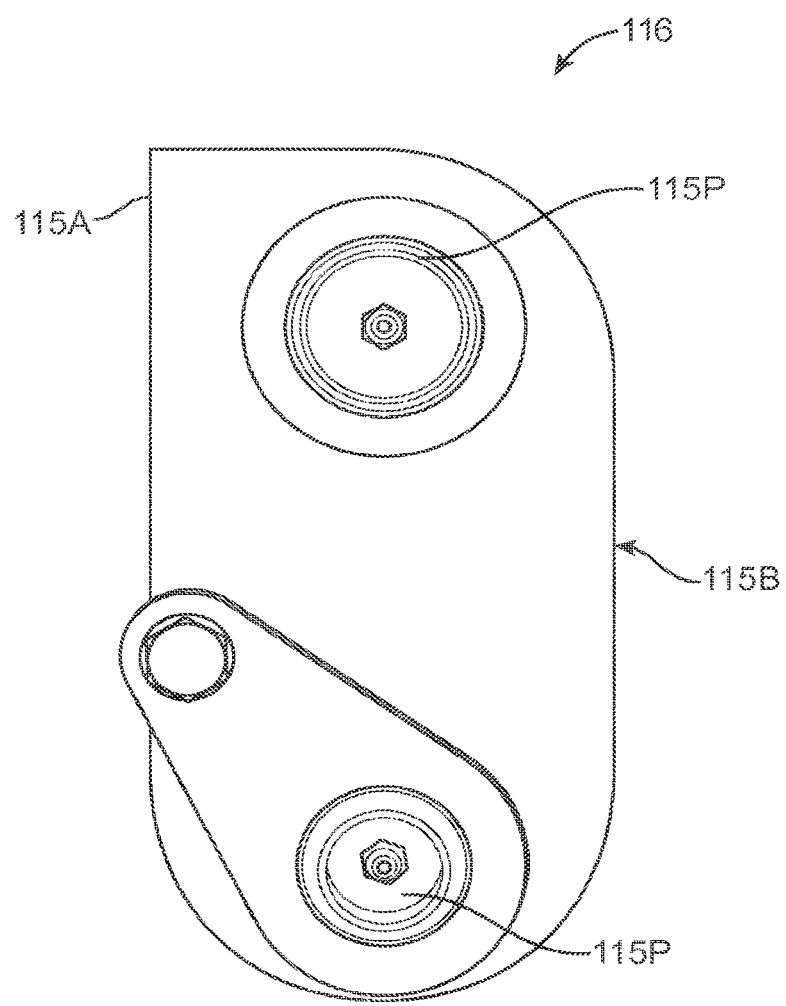
FIG. 31 shows a left side view of a shackle member of the lift gate shown in FIG. 9, in accordance with an embodiment of the invention.
Figure 32:
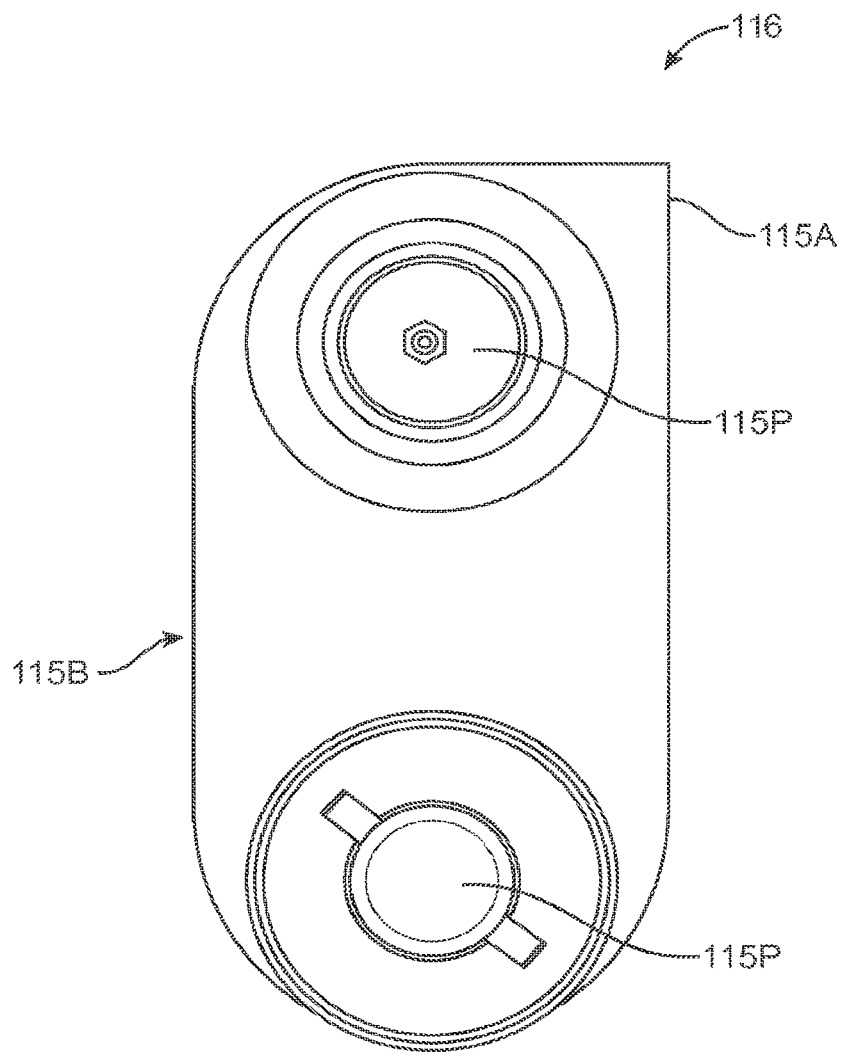
FIG. 32 shows a right side view of a shackle member of the lift gate shown in FIG. 9, in accordance with an embodiment of the invention.

FIG. 27 shows a rear perspective view of a shackle member 116. FIG. 28 shows another rear perspective view of the shackle member 116. FIG. 31 shows a right side view of a shackle member 116. FIG. 32 shows a left side view of the shackle member 116.

Each shackle member 116 is configured to make contact with a corresponding stop member 125 when the lift platform 130 is fully raised, providing said gap 126. Each shackle member 116 comprises a pair of shackle plates 115B, mounted in parallel relationship on a pair of pivot axis members 115P (i.e., an upper pivot axis member and a lower pivot axis member). The pivot axis members 115P are transverse to the plates 115B and allow the plates 115B to rotate about the pivot axis members 115P as the lifting mechanism 60 raises/lowers the platform 130.

Each shackle plate 115B includes a shackle extension 115A comprising a protrusion. The shackle extensions 115A of each shackle member 116 make direct contact with a corresponding stop member 125 when the lift platform 130 is fully raised, providing the said gap 126. In one example, in each shackle member 116, each shackle extension 115A comprises an essentially flat surface of an edge of its shackle plate 115B, for direct contact with an essentially flat surface of a stop member 126 of that shackle member 116.

In another embodiment, the stop members 125 may be placed elsewhere on the extension plate or (may be placed on the vehicle itself) to prevent direct impact between edge 111A of the extension plate 111 and edge 112A of the platform section 112 when the platform is rotated to the fully raised position to be horizontally aligned with the extension plate 111.

In one embodiment, when an extension plate is not used, the stop members 125 may be placed on the periphery of the vehicle opening itself, aligned with the shackle members 116, to provide a gap that prevents direct impact between edge 111A of the extension plate 111 and edge 112A of the platform section 112 when the platform is rotated to the fully raised position.

In another embodiment, the stop members 125 may be positioned to make direct contact with another part of the lift platform or linkage mechanism of the lift gate to provide a gap that prevents direct impact between edge 111A of the extension plate 111 and edge 112A of the platform section 112 when the lift platform is rotated to the fully raised position.

The components of the lift gate 100 may be made of different kinds of metals or non-metal rigid materials. For example, the shackles 116, stop members 125, extension plate 111, platform 130, lifting mechanism 60, etc, may be made of metal such as steel.

The present invention has been described in considerable detail with reference to certain preferred versions thereof; however, other versions are possible. Therefore, the spirit and scope of the appended claims should not be limited to the description of the preferred versions contained herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A lift gate system, comprising:
a lift platform, wherein the lift platform is configured to be stowed and unstowed via two or more actuators, such that when unstowed the lift platform can move between a raised position and a lowered position;
a lifting mechanism for moving the lift platform between the raised position and the lowered position relative to a mounting structure, wherein the lift platform is substantially aligned with a selected level relative to the mounting structure when the lift platform is in the raised position, and wherein in the stowed position the lift platform overlaps the mounting structure in a direction transverse to the selected level; and
at least one stop member that limits movement of the lift platform relative to the mounting structure when the lift platform is moving towards the raised position, providing a gap between the mounting structure and the lift platform when the lift platform is in the raised position.

2. The lift gate system of claim 1, wherein:
said at least one stop member is attached to the mounting structure.

3. The lift gate system of claim 1, wherein:
when the lift platform reaches the raised position, said at least one stop member makes direct contact with at least one of: a portion of said lift platform and a portion of said lifting mechanism.

4. The lift gate system of claim 1, wherein:
when the lift platform reaches the raised position, said at least one stop member makes contact with one or more of: an underside of said lift platform, a substantially vertical side of said lift platform, and a portion of said lifting mechanism.

5. The lift gate system of claim 1, further comprising:
at least one shackle member that interconnects said lift platform with said lifting mechanism;
wherein said at least one stop member is aligned with said at least one shackle member.

6. The lift gate system of claim 1, wherein:
the mounting structure comprises an extension plate coupled to an opening of a vehicle at said selected level;
said at least one stop member is proximate an edge of the extension plate;
said at least one stop member prevents direct impact between the extension plate and the lift platform when the lift platform is raised to the raised position; and
said at least one stop member restricts upward movement of the lift platform when the lift platform is in the raised position, thereby maintaining the lift platform in substantial alignment with the extension plate.

7. The lift gate system of claim 1, further comprising:
at least one shackle member that interconnects the lift platform with the lifting mechanism;
wherein each shackle member includes a shackle extension corresponding to a stop member of said at least one stop member, and each shackle extension is configured for making contact with its corresponding stop member when the lift platform is moved to the raised position, to prevent direct impact between the mounting structure and the lift platform when the lift platform is moved to the raised position.

8. The lift gate system of claim 1, wherein:
the mounting structure is configured to be coupled proximate an opening of a vehicle;
said at least one stop member is configured to be selectively attached to the vehicle; and
a portion of the lifting mechanism is configured for making contact with the at least one stop member when the lift platform is moved to the raised position, to prevent direct impact between the vehicle and the lift platform when the lift platform is moved to the raised position.

9. The lift gate system of claim 1, wherein:
the lifting mechanism comprises:
    a first pair of parallelogram linkages for supporting the lift platform;
    a second pair of parallelogram linkages for supporting the lift platform; and
    at least one pivot point on which an end of the lift platform is pivotably mounted for rotation.

10. A method, comprising:
positioning at least one stop member on a mounting structure relative to a lift platform of a lift gate, wherein the lift platform is configured to be stowed and unstowed via two or more actuators, such that when unstowed the lift platform can move between a raised position and a lowered position, wherein each stop member limits movement of the lift platform relative to the mounting structure when the lift platform is moving towards the raised position, providing a gap between the mounting structure and the lift platform when the lift platform is in the raised position;
wherein the lift platform is substantially aligned with a selected level relative to the mounting structure when the lift platform is in the raised position on the mounting structure, wherein the lift platform rests against a ground level when the lift platform is in a lowered position, wherein an upper surface of the lift platform maintains a substantially horizontal plane relative to the ground level as the lift platform moves between the raised position and the lowered position, and wherein in the stowed position the lift platform overlaps the mounting structure in a direction transverse to the selected level.

11. The method of claim 10, further comprising:
positioning each stop member on the mounting structure.

12. The method of claim 10, wherein:
when the lift platform reaches the raised position, said at least one stop member makes contact with one or more of: an underside of said lift platform, a substantially vertical side of said lift platform, and a portion of said lifting mechanism.

13. The method of claim 10, wherein:
the lift gate further comprises a lifting mechanism for moving the lift platform between the raised position and the lowered position; and
said at least one stop member makes direct contact with a portion of at least one of: said lifting mechanism and said lift platform.

14. The method of claim 13, further comprising:
interconnecting the lift platform with the lifting mechanism utilizing at least one shackle member;
wherein each shackle member includes a shackle extension corresponding to a stop member of said at least one stop member, and each shackle extension is configured for making contact with its corresponding stop member when the lift platform is moved to the raised position, to prevent direct impact between the mounting structure and the lift platform when the lift platform is moved to the raised position.

15. The method of claim 14, wherein:
the mounting structure comprises a frame coupled to an opening of a vehicle; and
each shackle extension is configured for making contact with its corresponding stop member when the lift platform is moved to the raised position, to prevent direct impact between the mounting structure and the lift platform when the lift platform is moved to the raised position.

16. The method of claim 13, wherein:
the lifting mechanism comprises:
    a first pair of parallelogram linkages for supporting the lift platform;
    a second pair of parallelogram linkages for supporting the lift platform; and
    at least one pivot point on which a distal end of the lift platform is pivotably mounted for rotation.

17. The method of claim 10, further comprising:
at least one shackle member that interconnects said lift platform with said lifting mechanism;
wherein said at least one stop member is aligned with said at least one shackle member to limit movement of the lift platform relative to the mounting structure when the lift platform is moving towards the raised position.

18. The method of claim 10, wherein:
the lift gate further comprises a lifting mechanism for moving the lift platform between the raised position and the lowered position;
the method further comprising positioning each stop member relative to the mounting structure;
said at least one stop member prevents direct impact between the extension plate and the lift platform when the lift platform is raised to the raised position; and
said at least one stop member restricts upward movement of the lift platform when the lift platform is in the raised position, thereby maintaining the lift platform in substantial alignment with the extension plate.

19. A lift gate system, comprising:
a lift platform, wherein the lift platform is configured to be stowed and unstowed, such that when unstowed the lift platform can move between a raised position and a lowered position;
a lifting mechanism for moving the lift platform between the raised position and the lowered position relative to a mounting structure, wherein the lift platform is substantially aligned with a selected level relative to the mounting structure when the lift platform is in the raised position, and wherein in the stowed position the lift platform overlaps the mounting structure in a direction transverse to the selected level; and at least one stop member that limits movement of the lift platform relative to the mounting structure when the lift platform is moving towards the raised position, providing a gap between the mounting structure and the lift platform when the lift platform is in the raised position;

wherein when the lift platform reaches the raised position, said at least one stop member makes contact with one or more of: an underside of said lift platform, a substantially vertical side of said lift platform, and a portion of said lifting mechanism.

20. The lift gate system of claim 19, wherein:

the lift platform is configured to be stowed and unstowed via two or more actuators.

* * * * *